(12) United States Patent
Sato et al.

(10) Patent No.: US 7,085,855 B1
(45) Date of Patent: Aug. 1, 2006

(54) DATA TRANSFER CONTROL DEVICE AND ELECTRONIC EQUIPMENT

(75) Inventors: Daisuke Sato, Suwa (JP); Hiroshi Horiuchi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 911 days.

(21) Appl. No.: 09/686,914

(22) Filed: Oct. 12, 2000

(30) Foreign Application Priority Data

Oct. 15, 1999 (JP) ............................... 11-293589

(51) Int. Cl.
*G06F 15/16* (2006.01)

(52) U.S. Cl. ...................... 709/253; 709/250; 710/33; 710/52; 710/107; 714/712; 370/463; 370/391; 370/389; 386/46; 386/67

(58) Field of Classification Search ............... 709/253, 709/213, 224, 250; 710/107, 58, 129, 315, 710/33, 605, 316, 52; 386/46, 67; 702/122; 370/84, 463, 391, 389; 714/712
See application file for complete search history.

(56) References Cited

U.S. PATENT DOCUMENTS

| | | | |
|---|---|---|---|
| 5,404,548 A * | 4/1995 | Nishioka | 710/52 |
| 5,412,803 A * | 5/1995 | Bartow et al. | 709/213 |
| 5,457,694 A * | 10/1995 | Smith | 714/712 |
| 5,535,208 A * | 7/1996 | Kawakami et al. | 370/391 |
| 5,764,930 A * | 6/1998 | Staats | 710/107 |
| 5,923,673 A | 7/1999 | Henrikson | 714/712 |
| 6,219,736 B1 * | 4/2001 | Klingman | 710/315 |
| 6,298,406 B1 * | 10/2001 | Smyers | 710/305 |
| 6,332,159 B1 * | 12/2001 | Hatae et al. | 709/224 |
| 6,343,260 B1 * | 1/2002 | Chew | 702/122 |
| 6,360,053 B1 * | 3/2002 | Wood et al. | 386/67 |
| 6,389,496 B1 * | 5/2002 | Matsuda | 710/316 |
| 6,512,767 B1 * | 1/2003 | Takeda et al. | 370/389 |

(Continued)

FOREIGN PATENT DOCUMENTS

EP 0 682 430 A2 11/1995

(Continued)

OTHER PUBLICATIONS

"1394 Bridge Controller, INIC-1410: ATA/ATAPI IDE to IEEE1394 Bridge Controller Solution", Taking Data Further. ™, Initio Corporation, Feb. 1, 2000.

(Continued)

*Primary Examiner*—Thong Vu
*Assistant Examiner*—Hai V. Nguyen
(74) *Attorney, Agent, or Firm*—Oliff & Berridge, PLC

(57) ABSTRACT

The objective of the present invention is to provide a data transfer control device and electronic equipment that guarantee stable operation even if a reset that clears the node topology information occurs. When a CPU (firmware) of a data transfer control device in accordance with the IEEE 1394 standard issues a data transfer start (or resume) command during a bus reset period, the execution of that command is canceled. The fact that the command has been canceled is informed to the CPU by an interrupt. The command is canceled by using a signal that is active during the bus reset period to mask a signal that goes active when a command is issued. When a pause command is issued, the transfer processing pauses at a previously determined pause location. Transfer data is automatically divided into a series of packets to be transferred continuously by the hardware. When a resume command and a pause command for transfer data have been issued together, the CPU executes the transfer processing in steps then pauses the transfer processing.

19 Claims, 24 Drawing Sheets

U.S. PATENT DOCUMENTS 6,810,445 B1 * 10/2004 Sato et al. .................... 710/33
2002/0057893 A1 * 5/2002 Wood et al. .................. 386/46

FOREIGN PATENT DOCUMENTS

| EP | 0 831 496 A2 | 3/1998 |
|----|---|---|
| JP | A 8-293879 | 11/1996 |
| JP | A 10-178438 | 6/1998 |
| JP | A 11-224220 | 8/1999 |

OTHER PUBLICATIONS http://www.oxsemi.com/products/main.html, "Lastest product—the OXFW900", Mar 14, 2000.

"SAA7356HL, P1394a Compatibility Asynchronous Link Layer Controller", Phillips Semiconductors Co., Ltd. w/English-language translation.

Serial Bus Reset Detection, XP-002190496, Mar. 20, 1997.

* cited by examiner

F I G. 2
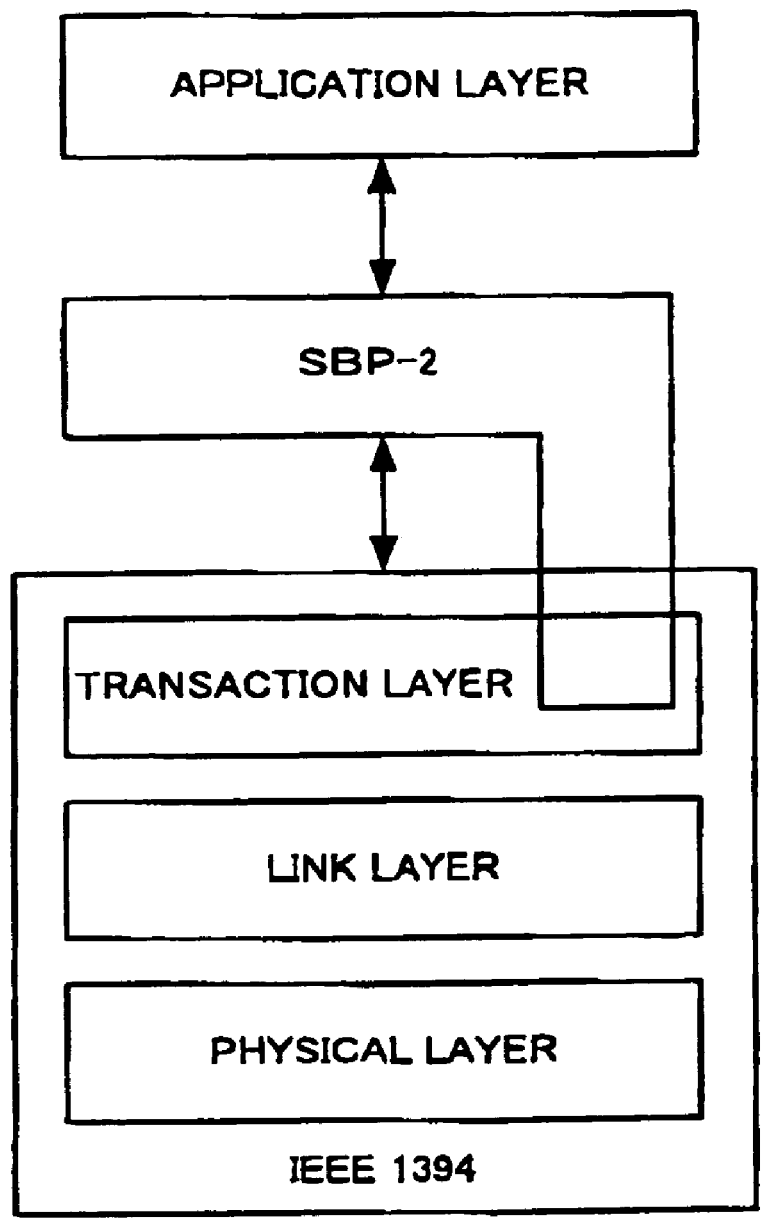

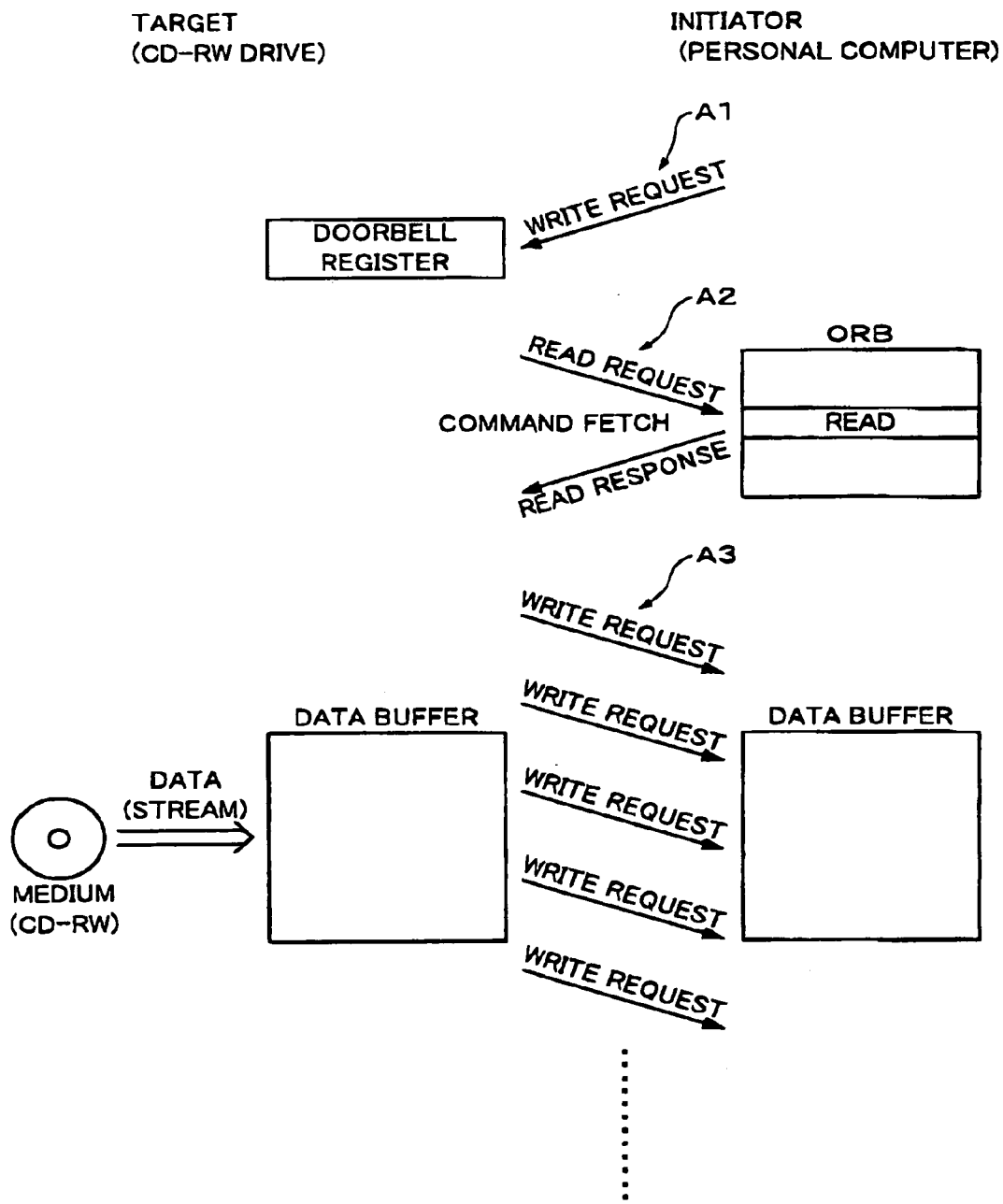

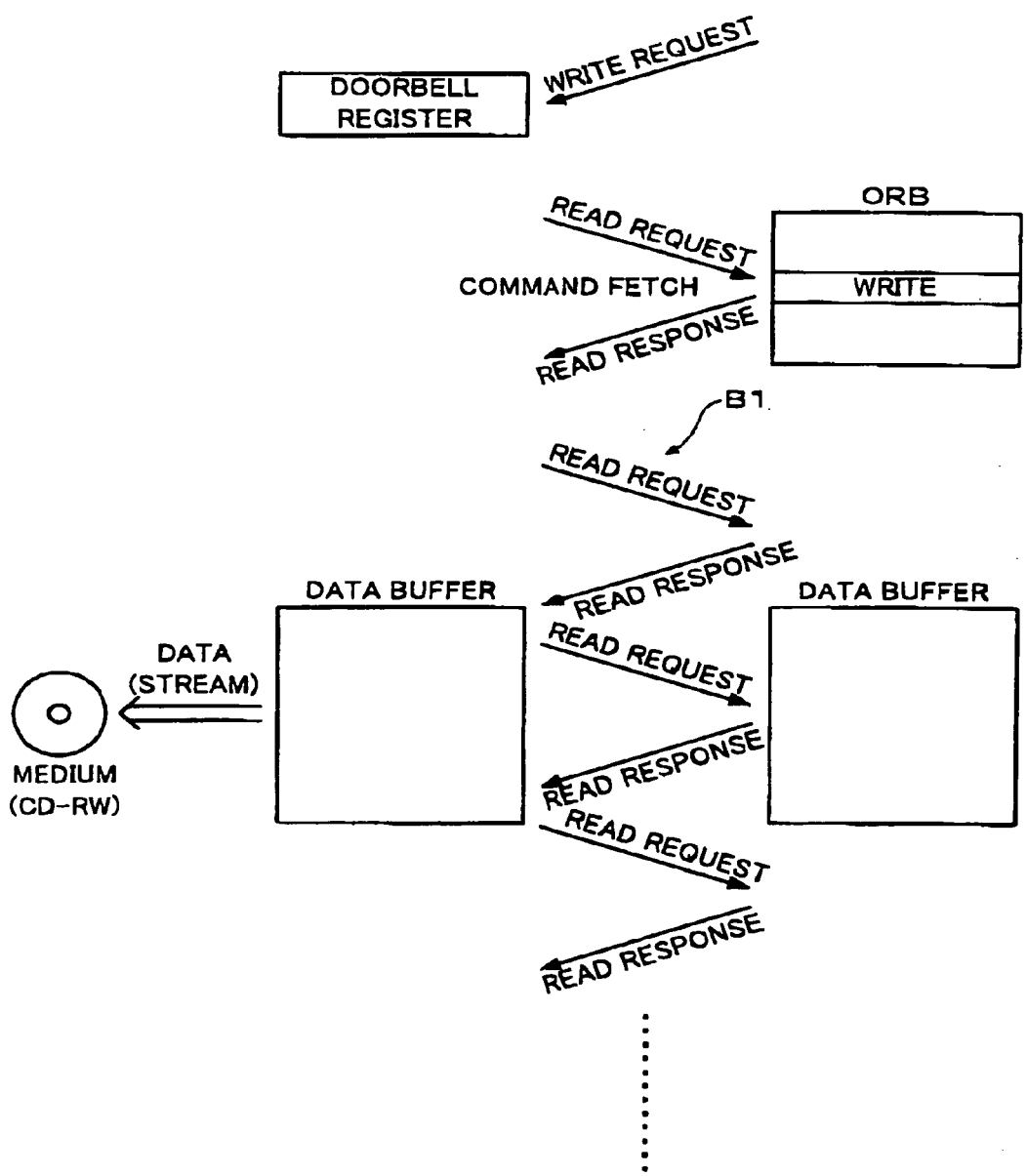

FIG. 6A
TARGET (SELF NODE) ←IEEE 1394→ INITIATOR (ANOTHER NODE)
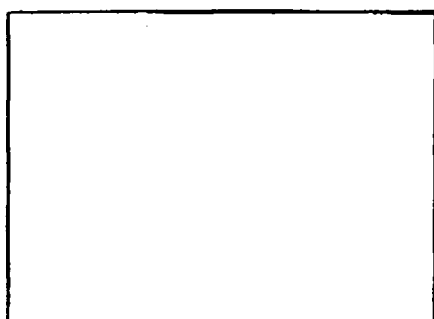
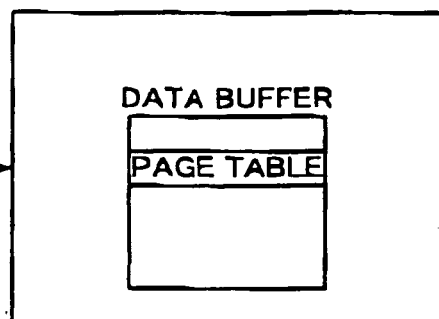
FIG. 6B
WHEN A PAGE TABLE EXISTS
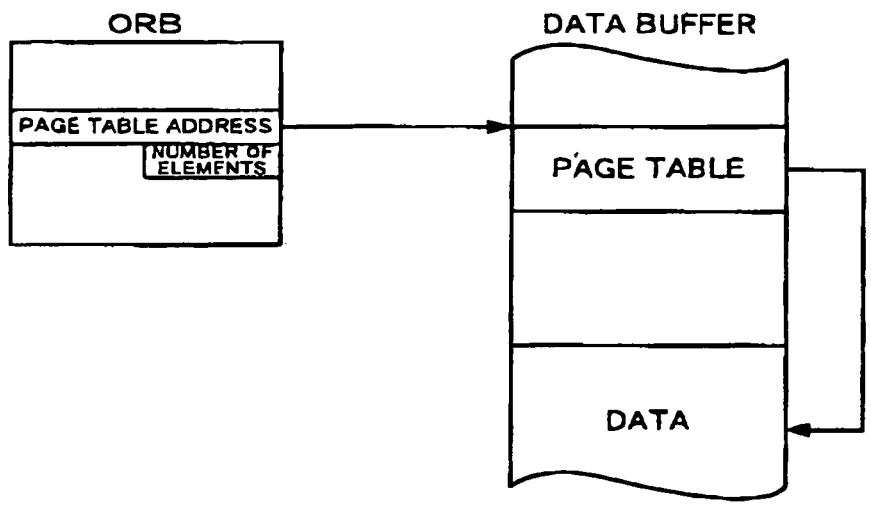
FIG. 6C
WHEN NO PAGE TABLE EXISTS
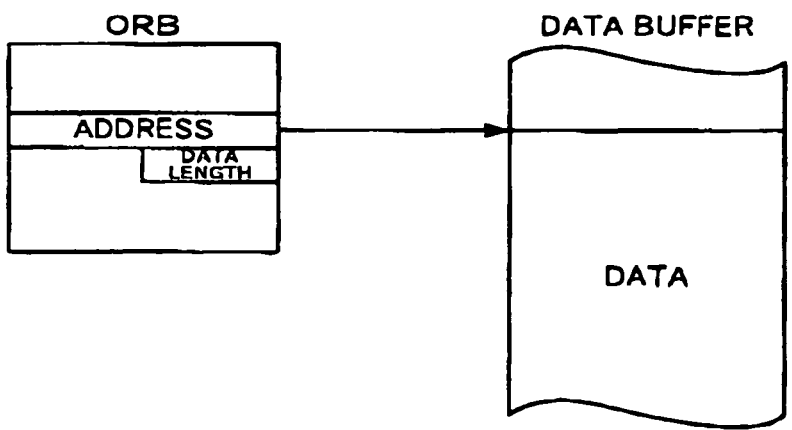

F I G. 1 1
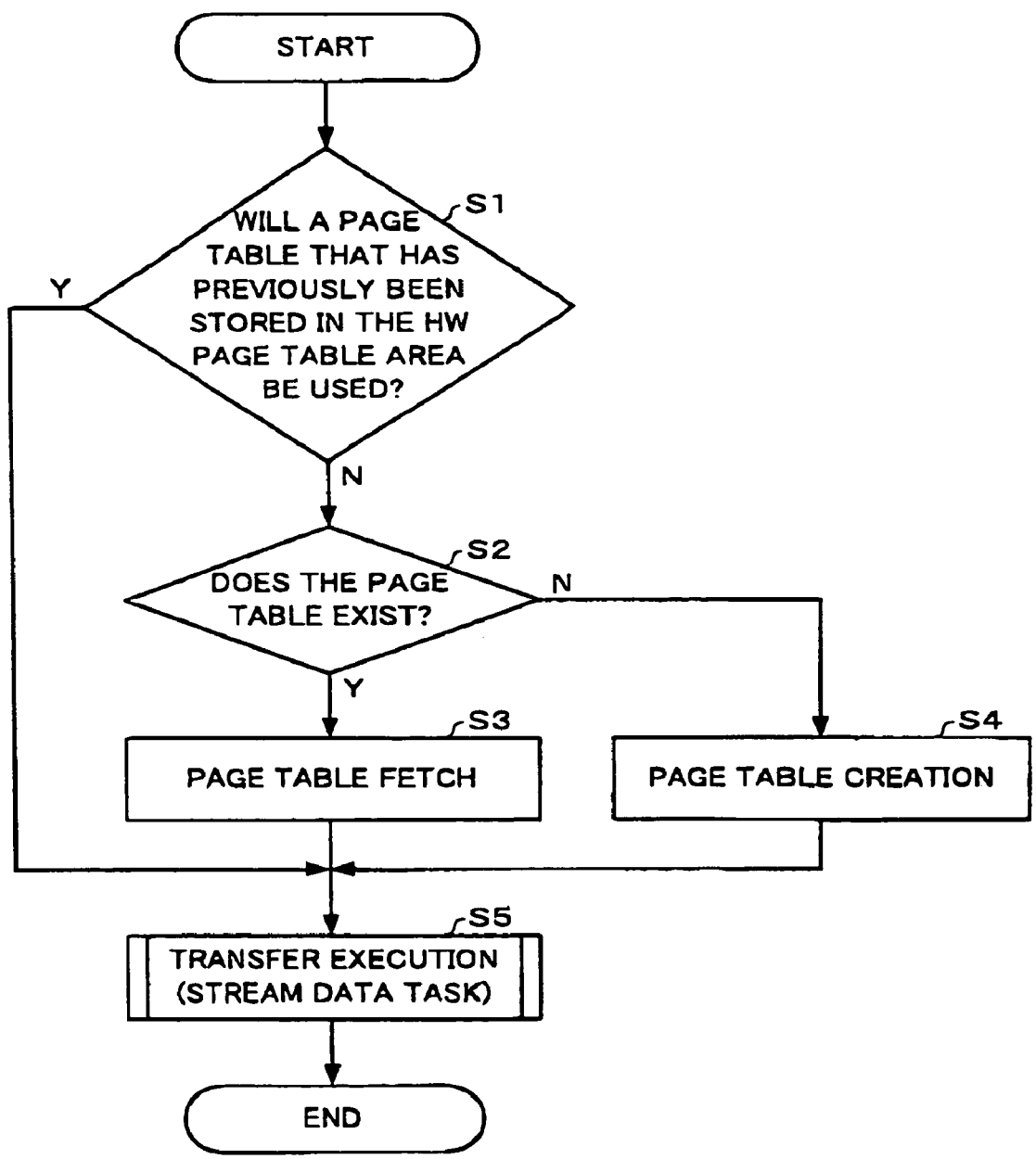

DATA TRANSFER CONTROL DEVICE AND ELECTRONIC EQUIPMENT

BACKGROUND OF THE INVENTION

1. Field of the Invention

The present invention relates to a data transfer control device and electronic equipment comprising the same, and, in particular, to a data transfer control device that enables data transfer in accordance with the IEEE 1394 standard between a plurality of nodes connected to a bus, and electronic equipment comprising the same.

2. Description of Related Art

An interface standard called IEEE 1394 has recently been attracting much attention. This IEEE 1394 has standardized high-speed serial bus interfaces that can handle the next generation of multimedia devices. IEEE 1394 makes it possible to handle data that is required to have real-time capabilities, such as moving images. A bus in accordance with IEEE 1394 can be connected not only to peripheral equipment for computers, such as printers, scanners, CD-RW drives, and hard disk drives, but also to domestic appliances such as video cameras, VCRs, and TVs. This standard is therefore expected to enable a dramatic acceleration of the digitalization of electronic equipment.

Under this IEEE 1394, an event called a bus reset occurs when new electronic equipment is connected to the bus, electronic equipment is removed from the bus, or the number of nodes connected to the bus increases. When a bus reset occurs, the topology information relating to the nodes is cleared then this topology information is automatically set again. In other words, after a bus reset, tree identification (determination of the root node) and self identification are performed, then the nodes that are to act as management nodes, such as the isochronous resource manager, are determined. Ordinary packer transfer then starts.

Since the topology information is automatically set again after a bus reset, this enables a "hot state" in which cables can be unplugged or plugged (hot plugs). This enables ordinary users to remove cables as desired, in the same manner as with ordinary domestic electrical appliances such as VCRs, which is useful in promoting home network systems.

However, it has become clear that the occurrence of such a bus reset causes problems, as described below.

In other words, since the unplugging or the plugging of a cable causes a bus reset, the firmware (processing means) operating in the CPU is unable to forecast when such a bus reset will occur. It could therefore happen that the firmware issues a command to start a data transfer during the bus reset period after a bus reset has occurred (or at substantially the same time as a bus reset). When such a situation occurs, it is possible that an error could occur, such as the start of transmission of a packet that ought to have been invalidated by the bus reset.

SUMMARY OF THE INVENTION

The present invention was devised in the light of the above described technical problems, and has as an objective thereof the provision of a data transfer control device that guarantees stable operation even when a reset that clears the node topology information has occurred, and electronic equipment using the same.

In order to solve the above described technical problems, the present invention relates to a data transfer control device for transferring data among a plurality of nodes that are connected to a bus, the data transfer control device comprising:

means for starting transfer processing when processing means issues a start command for data transfer, and for resuming transfer processing when the processing means issues a resume command for data transfer;

cancellation means for canceling an execution of the start command or the resume command, when the processing means issues the start command or the resume command during a period of a reset that clears node topology information; and means for informing the processing means that command execution has been canceled by the reset.

This aspect of the present invention ensures that, when the processing means issues a start (or resume) command during a reset period (such as a bus reset period in accordance with the IEEE 1394 standard), the execution of that command is canceled. This makes it possible to prevent problems such as the transfer of a packet that ought to have been invalidated, the causing of misoperation in other circuit blocks, or disruption of the operation of the processing means. This makes it possible to guarantee stable operation even when a reset that clears node topology information has occurred. Since the processing means is informed that command execution has been canceled, it can proceed to further processing such the re-issue of the canceled command.

This aspect of the present invention may comprise:

means for issuing an interrupt with respect to the processing means when an execution of the start command or the resume command for data transfer is canceled by the occurrence of the reset; and factor storage means for informing the processing means of a factor of the interrupt.

This configuration makes it possible to inform the processing means of the cancellation of the command in a reliable and efficient manner.

In this aspect of the present invention, the cancellation means may cancel the start command or the resume command by using a signal that goes active during the reset period to mask a signal that goes active when the processing means issues the start command or the resume command. This configuration makes it possible to efficiently prevent the transfer of a start (or resume) command issued by the processing means to other circuit blocks of the data transfer control device.

This aspect of the present invention may further comprise means for pausing transfer processing at a previously determined location when the processing means issues a data transfer pause command or when a transfer error occurs. This configuration makes it possible to pause transfer processing then resume the transfer processing after other processing has been performed as appropriate, even when a reset that clears node topology information has occurred after a start (or resume) command has been issued.

This aspect of the present invention may further comprise transfer execution means for executing processing for dividing transfer data into a series of packets then transferring the divided series of packets continuously, when the processing means issues the start command for data transfer. When the thus configured transfer execution means is included, a serious problem may occur in that a series of packets could be transferred one after another when a start command is issued once during the reset period, unless the processing means halts the transfer processing. However, this aspect of the invention makes it possible to prevent this problem by ensuring that any start command that is issued within the reset period is canceled immediately.

Note that it is preferable that the reset is a bus reset as defined by the IEEE 1394 standard.

Another aspect of the present invention relates to a data transfer control device for transferring data among a plurality of nodes that are connected to a bus, the data transfer control device comprising:

transfer execution means for executing processing for dividing transfer data into a series of packets then transferring the divided series of packets continuously, when processing means issues a start command for data transfer; and pause means for pausing a transfer processing after a step execution of the transfer processing, when the processing means issues a resume command and a pause command for data transfer together.

With this aspect of the invention, the transfer processing is executed in steps when the processing means has issued the data transfer the resume command and the pause command together. This makes it possible to send one packet at a time, making it possible to provide effective means to debugging the data transfer control device.

In this aspect of the present invention, the pause means may execute the step execution and the pause of the transfer processing, based on a resume signal that goes active when the resume command is issued, and a delay pause signal that goes active after a delay of a given period after the resume signal goes active when the resume command and the pause command are issued together. This configuration makes it possible to implement step execution of transfer processing, by a simple technique such as the provision of a delay means for creating a delay pause signal.

It is preferable that the data transfer control device of these aspects of the present invention performs data transfer in accordance with the IEEE 1394 standard.

Electronic equipment in accordance with a further aspect of the present invention comprises any one of the above described data transfer control devices; a device for performing given processing on data that has been received from another node via the data transfer control device and the bus; and a device for outputting or storing data that has been subjected to the processing. Electronic equipment in accordance with a still further aspect of the present invention comprises any one of the above described data transfer control devices; a device for performing given processing on data that is to be transferred to another node via the data transfer control device and the bus; and a device for fetching data to be subjected to the processing.

Since this aspect of the invention makes it possible to reduce the load on the firmware or the like that controls data is transfer, the cost of the electronic equipment can be reduced and the processing speed thereof can be increased. In addition, the reliability of the electronic equipment can be increased because it is possible to prevent situations in which the system is impeded by the occurrence of a reset that clears topology information.

BRIEF DESCRIPTION OF THE DRAWINGS

FIG. 2 illustrates the SBP-2;
FIG. 4 illustrates command processing when data (a data stream) is transferred from a target to an initiator;
FIG. 5 illustrates command processing when data (a data stream) is transferred from an initiator to a target;

FIGS. 6A, 6B, and 6C illustrate page tables;
FIG. 11 is a flowchart illustrating the operation of the main control circuit.

DETAILED DESCRIPTION OF THE PREFERRED EMBODIMENTS

Preferred embodiments of the present invention are described below with reference to the accompanying drawings.

1. IEEE 1394

The description first relates to an outline of IEEE 1394.

1.1 Outline

The IEEE 1394 standard (IEEE 1394–1995, P1394.a) enables high-speed data transfer at 100 to 400 Mbps (P1394.b concerns 800 to 3.200 Mbps). It also permits the connection of nodes of different transfer speeds to the same bus.

The nodes are connected in a tree configuration in which a maximum of 63 nodes can be connected to one bus. Note that the use of bus bridges enables the connection of approximately 64.000 nodes.

IEEE 1394 provides for asynchronous transfer and isochronous transfer as packet transfer methods. In this case, asynchronous transfer is suitable for data transfers where reliability is required and isochronous transfer is suitable for transfers of data such as moving images and audio, where real-time capabilities are required.

1.2 Layer Structure

Figure 1:
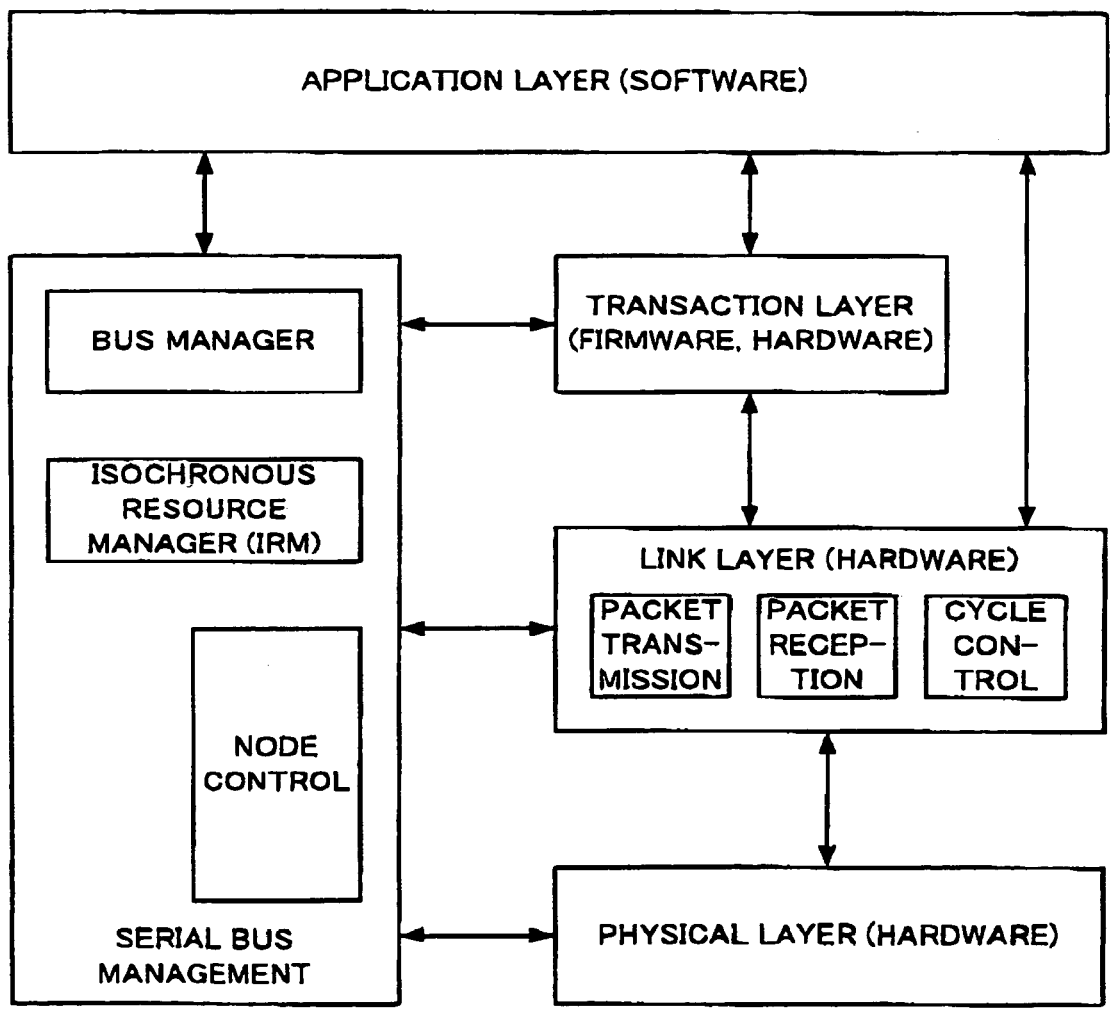
FIG. 1 shows the layer structure of IEEE 1394.

The layer structure (protocol structure) covered by IEEE 1394 is shown in FIG. 1.

The IEEE 1394 protocol comprises a physical layer, a link layer, and a transaction layer. The serial bus management monitors and controls the physical layer, link layer, and transaction layer, and provides various functions for controlling nodes and managing bus resources.

The transaction layer provides an interface (service) for upper layers at each transaction and executes transactions such as read transactions, write transactions, and lock transactions through the interface provided by the lower link layer.

In this case, a read transaction causes data to be transmitted from the responding node to the node that requested the data. Similarly, a write transaction causes data to be transmitted from the request node to the responding node. A lock transaction causes data to be transmitted from the request node to the responding node, and the responding node then processes that data and returns it to the request node.

The link layer provides functions such as addressing, data check, data framing for packet transmission/reception, and cycle control for isochronous transfer.

The physical layer converts the logical symbols used by the link layer into electrical signals, performs bus arbitration, and defines the physical bus interface.

1.3 SBP-2

A protocol called the serial bus protocol 2 (SBP-2) has been proposed as a higher-order protocol that comprises some of the functions of the transaction layer under IEEE 1394, as shown in FIG. 2.

In this case, SBP-2 is proposed in order to enable utilization of the SCSI command set on the IEEE 1394 protocol. Use of this SBP-2 minimizes the changes to be made to the SCSI command set that is used in electronic equipment that conforms to the existing SCSI standards, but enables use in electronic equipment that conforms to the IEEE 1394 standard. The design and development of electronic equipment can be simplified thereby. Since it is also possible to encapsulate device-specific commands, not just SCSI commands, this increases the universality of the command set.

Figure 3:
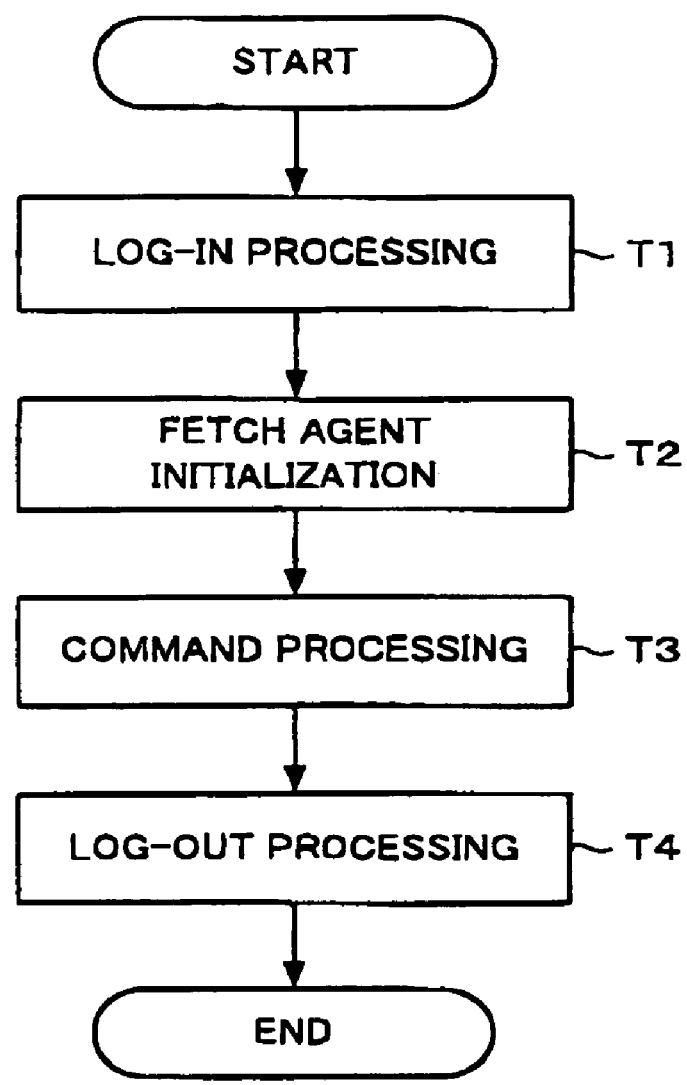
FIG. 3 illustrates the concept of data transfer processing under SBP-2.

With SBP-2, log-in processing is done by first using a log-in operation request block (ORB) created by an initiator (such as a personal computer), as shown in FIG. 3 (step T1). A dummy ORB is then used to initialize a fetch agent (step T2). A command is executed by using a normal command ORB (step T3), and finally log-out processing is done by a log-out ORB (step T4).

During the command processing of step T3, the initiator transmits a write request packet (executes a write request transaction) to ring a doorbell register of the target, as shown at A1 in FIG. 4. When that happens, the target transmits a read request packet and the initiator returns a read response packet, as shown at A2. This causes the ORB created by the initiator (a normal command ORB) to be fetched into a data buffer at the target. The target analyzes any commands comprised within the fetched ORB.

When a command comprised within the ORB is a SCSI read command, the target transmits a series of write request packets to the initiator, as shown at A3. This causes the transmission of data, such as data (a data stream) that has been read out from a medium (CD-RW) at the target, to a data buffer in the initiator.

When a command comprised within the ORB is a SCSI write command, on the other hand, the target transmits a read request packet to the initiator and the initiator returns the corresponding read response packet, as shown at B1 in FIG. 5. This causes the data (a data stream) that is stored in a data buffer of the initiator to be transmitted to the target, than written to a medium at the target (or printed, if the target is a printer).

With this SBP-2, the target can transmit a request packet (execute a transaction) and send or receive data when its own circumstances allow. Since it is therefore not necessary for the initiator and the target to operate simultaneously, the efficiency of data transfer can be increased.

Note that protocols other than SBP-2 are also being proposed as protocols of a higher order than IEEE 1394, such as the function control protocol (FCP).

When data is to be transferred between the target and the initiator, the sequence depends on whether a page table exists in a data buffer (storage means) at the initiator (another node), as shown in FIG. 6A, or whether no such table exists.

When a page table exists, the address of that page table and the number of elements therein is comprised within the ORB created by the initiator, as shown in FIG. 6B. The address of the transfer data (the read address or write address thereof) is specified as an indirect address using that page table.

When no such table exists, on the other hand, an address and data length are comprised within the ORB, as shown in FIG. 6C, so that the address of the transfer data is specified as a direct address.

1.4 Bus Reset

Under IEEE 1394, a bus reset occurs when the power is turned on or when a device is unplugged or plugged during operation. In other words, each node monitors port voltage changes. When there is a change in voltage at a port due to a factor such as a new node being connected to the bus, the node that detects that change informs the other nodes on the bus that a bus reset has occurred. The physical layer of each node conveys the fact that a bus reset has occurred to the corresponding link layer.

When such a bus reset occurs, topology information such as node IDs is cleared. This topology information is automatically set again afterwards. In other words, tree identification and self identification are performed after a bus reset. Subsequently, the nodes that are to act as management nodes, such as the isochronous resource manager, cycle master, and bus manager, are determined. Ordinary packet transfer then starts.

Since topology information is automatically set again after a bus reset in accordance with IEEE 1394, this makes it possible to implement "hot plugging" such that any item of electronic equipment can be freely unplugged or plugged from the bus.

Note that if a bus reset occurs during a transaction, that transaction is aborted. The request node that issued the transaction that was aborted transmits the corresponding request packet again after the topology information has been set again. The responding node does not send a response packet back to the request node for the transaction that was aborted by the bus reset.

2. Overall Configuration

The overall configuration of this embodiment of the invention is described below, with reference to FIG. 7.

Figure 7:
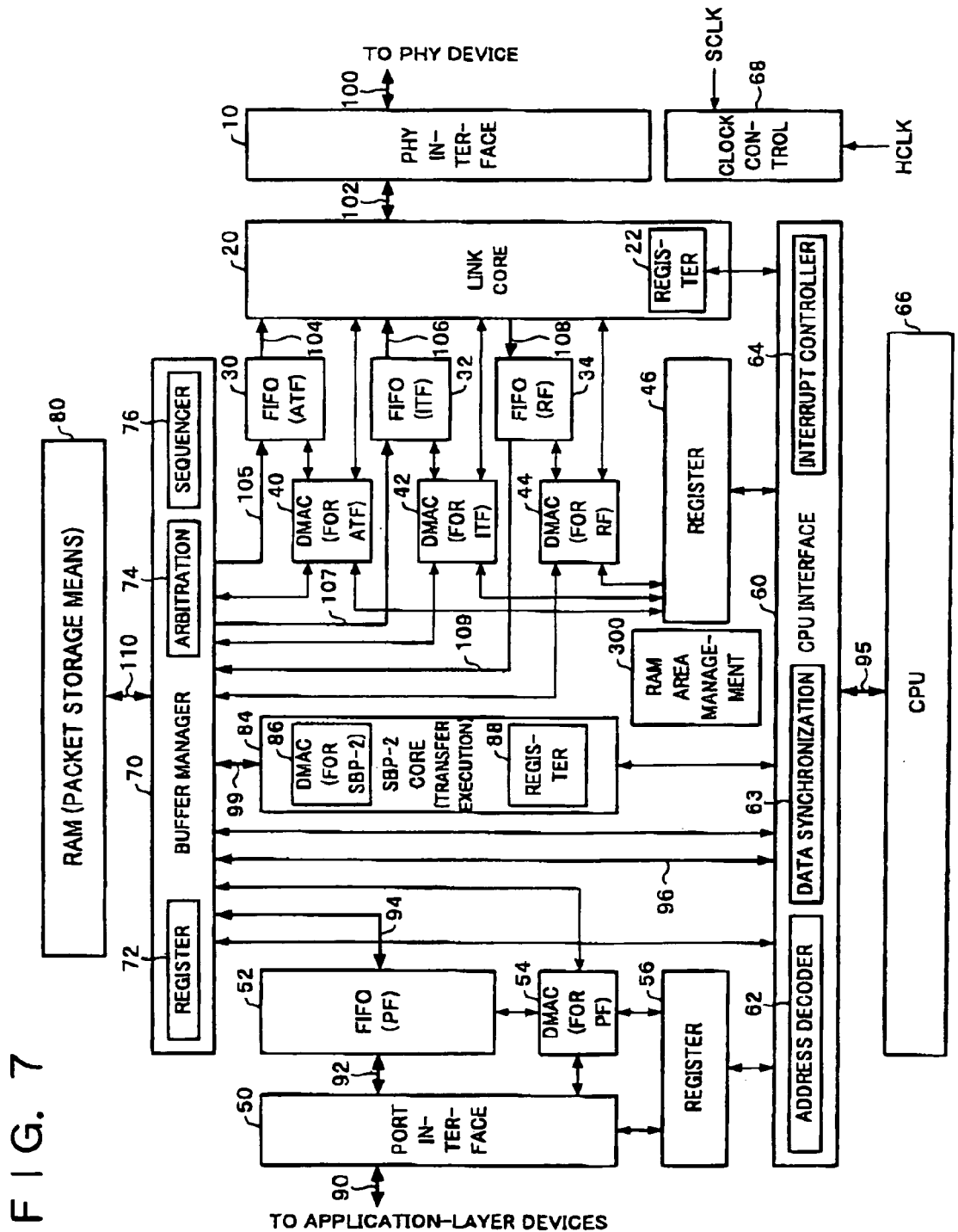
FIG. 7 shows an example of the configuration of a data transfer control device in accordance with an embodiment of the present invention.

In FIG. 7, a PHY interface 10 is a circuit that provides an interface with a PHY device (a physical layer device).

A link core 20 (link means) is a circuit implemented in hardware that provides part of the link layer protocol and the transaction layer protocol; it provides various services relating to packet transfer between nodes. A register 22 is provided to control the link core 20.

A FIFO (asynchronous transmission FIFO) 30, a FIFO (isochronous transmission FIFO) 32, and a FIFO (reception FIFO) 34 are FIFOs for asynchronous transmission, isochronous transmission, and reception, respectively; each being configured of hardware means such as registers or semiconductor memory. In this embodiment of the invention, these FIFOs 30, 32, and 34 have an extremely small number of stages. For example, the number of stages per FIFO is preferably no more than three, and more preferably no more than two.

A DMAC 40 (read means), a DMAC 42 (read means), and a DMAC 44 (write means) are DMA controllers for ATP, ITF, and RF, respectively. Use of these DMACs 40, 42, and 44 makes it possible to transfer data between a RAM 80 and the link core 20 without going through a CPU 66. Note that a register 46 provides control such as that over the DMACs 40, 42, and 44.

A port interface 50 is a circuit that provides an interface with application-layer devices (such as printer drivers, by way of example).

A FIFO (PF) 52 is a FIFO used for transferring data to and from an application-layer device and a DMAC 54 is a DMA controller for PF. A register 56 provides control over the port interface 50 and the DMAC 54.

An SBP-2 core 84 (transfer execution circuit) is a circuit that implements part of the SBP-2 protocol and part of the transaction layer by hardware. The functions of this SBP-2 core 84 make it possible to divide transfer data into a series of packets then transfer the thus-divided series of packets continuously. Note that a register 88 is used to provided control over the SBP-2 core 84 and a DMAC (for SBP-2) 86 is a DMA controller for the SBP-2 core 84.

A RAM area management circuit 300 is a circuit for managing the various areas within the RAM 80. When each of the areas within the RAM 80 becomes full or empty, the RAM area management circuit 300 uses various full or empty signals to control the DMACs 40, 42, 44, 54, and 86.

A CPU interface 60 provides an interface with the CPU 66 (processing means) that controls the data transfer control device. The CPU interface 60 comprises an address decoder 62, a data synchronizer 63, and an interrupt controller 64. A clock control circuit 68 controls the clock signals used by this embodiment, and SCLK (the system clock for the data transfer control device) that is sent from the PHY device (PHY chip) and HCLK (the operating clock of the CPU 66) are input thereto.

A buffer manager 70 is a circuit that manages the interface with the RAM 80. The buffer manager 70 comprises a register 72 for controlling the buffer manager, an arbitration circuit 74 that arbitrates the bus connection to the RAM 80, and a sequencer 76 that generates various control signals.

The RAM 80 functions as a randomly accessible packet storage means, where this function is implemented by SRAM, SDRAM, or DRAM or the like.

Note that the RAM 80 is preferably accommodated within the data transfer control device of this embodiment. However, it is possible to attach part or all of the RAM 80 externally.

Figure 8:
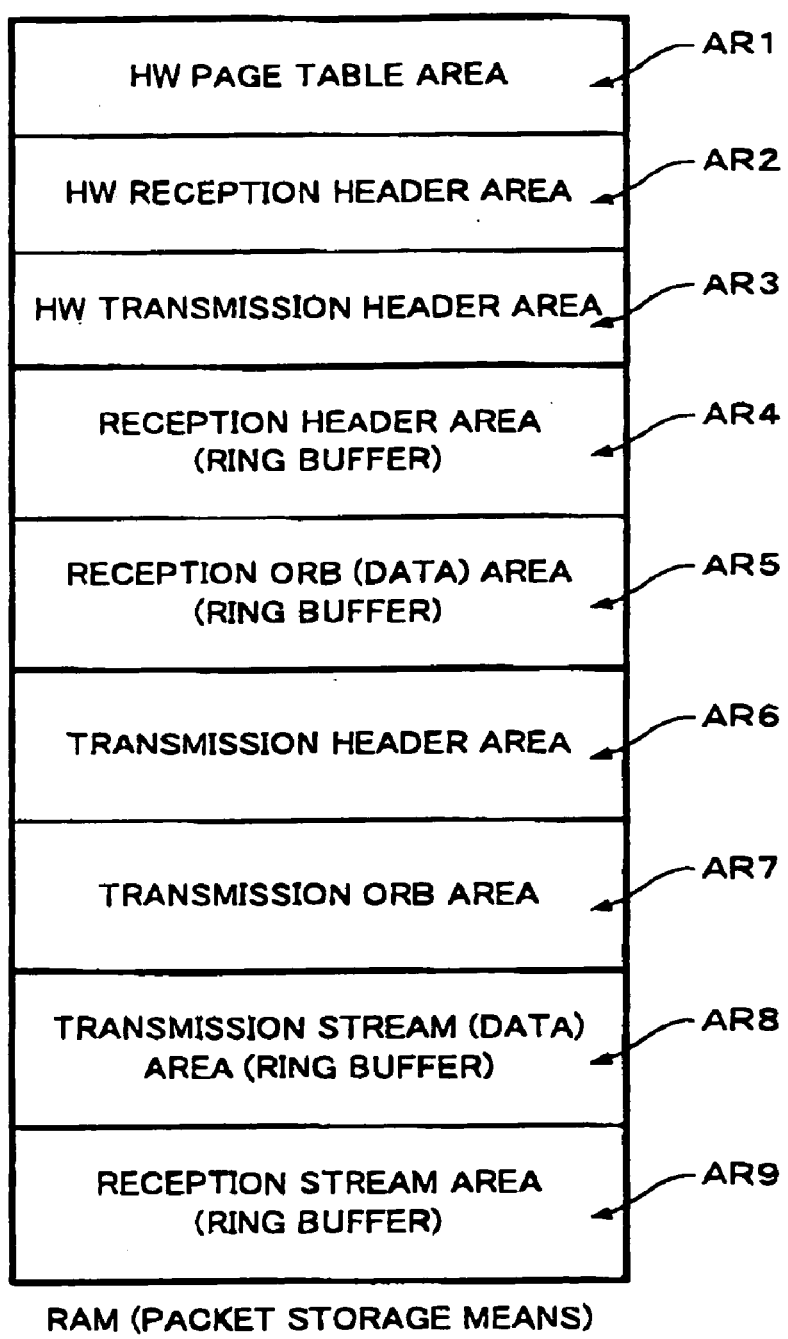
FIG. 8 illustrates a technique of separating (dividing) within a RAM (packet storage means)

An example of the memory map of the RAM 80 is shown in FIG. 8. In this embodiment of the invention as shown in FIG. 8, the RAM 80 is divided into header areas (AR2, AR3, AR4, and AR6) and data areas (AR5, AR7, AR8, and AR9). The header of a packet (broadly speaking, control information) is stored in a header area and the data (ORB and stream) is stored in a data area.

In this embodiment of the invention, the data areas (AR5, AR7, AR8, and AR9) in the RAM 80 are divided into ORB areas (AR5 and AR7) and stream areas (AR8 and AR9).

In addition, the RAM 80 in this embodiment is divided into reception areas (AR2, AR4, AR5, and AR9) and transmission areas (AR3, AR6, AR7, and AR8).

Note that each ORB (first data for a first layer) is data (commands) conforming to SBP-2 as described above. A stream (second data for a second layer that is above the first layer) is data for the application layer (such as print data for a printer, read or write data for a CD-RW, or image data that has been fetched by a scanner).

A page table area for hardware (HW), a reception header area for HW, and a transmission header area for HW, denoted by AR1, AR2, and AR3, are areas used by the SBP-2 core 84 of FIG. 7 for writing and reading the page table, reception header, and transmission header.

Note that the areas denoted by AR4, AR5, AR8, and AR9 in FIG. 8 form a structure called a ring buffer.

A bus 90 (or buses 92 and 94) shown in FIG. 7 is for connections to applications (a first bus). Another bus 95 (or bus 96), which is for controlling the data transfer control device or for reading and writing data, is connected electrically to a device (such as a CPU) that controls the data transfer control device, as a second bus. Yet another bus 100 (or buses 102, 104, 105, 106, 107, 108, and 109) is for electrical connections to physical-layer devices (such as a PHY device), as a third bus. A further bus 110 (a fourth bus) is for electrical connections to RAM that acts as a randomly accessible storage means. A still further bus 99 (a fifth bus) is for reading and writing header information and page table information, to enable the SBP-2 core 84 to implement SBP-2 by hardware.

The arbitration circuit 74 in the buffer manager 70 arbitrates bus access requests from the DMACs 40, 42, and 44, the CPU interface 60, and the DMACs 86 and 54. Based on the results of this arbitration, a data path is established between one of the buses 105, 107, 109, 96, 99, and 94 and the bus 110 of the RAM 80 (i.e., a data path is established between one of the first, second, third, and fifth buses and the fourth bus).

One feature of this embodiment is the way in which it is provided with the RAM 80, which stores packets in a randomly accessible manner, and also the mutually independent buses 90, 96, 99, and 100 as well as the arbitration circuit 74 for connecting one of those buses to the bus 110 of the RAM 80.

Figure 9:
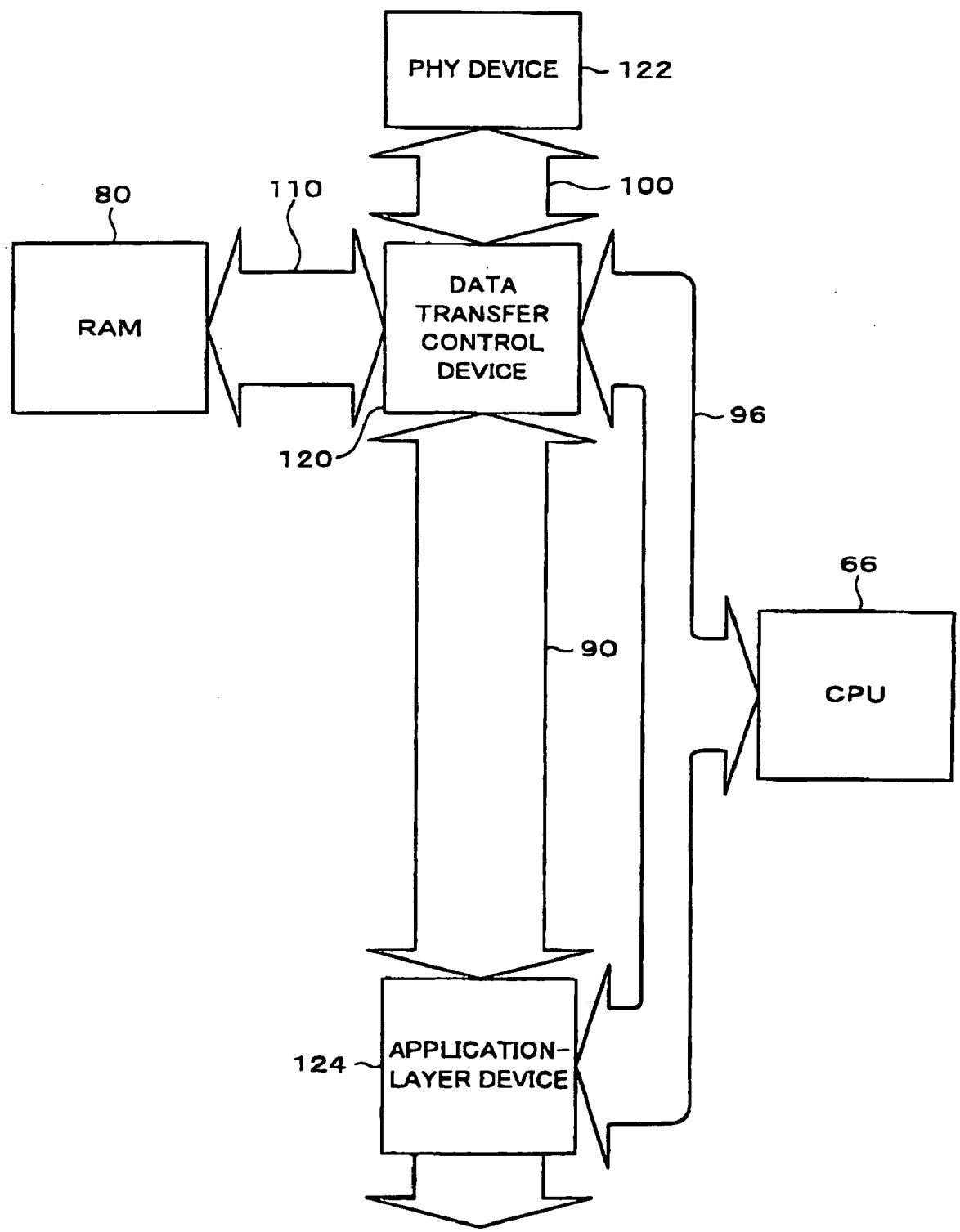
FIG. 9 illustrates a data transfer technique in accordance with this embodiment of the invention.

This configuration makes it possible to separate the bus 90 between a data transfer control device 120 and an application-layer device 124; the CPU bus 96; and the bus 110 between the data transfer control device 120 and the RAM 80, as shown in FIG. 9. The CPU bus 96 can therefore be used solely for controlling data transfer. In addition, the bus 90 is dedicated so that it can be used for data transfer between the data transfer control device 120 and the application-layer device 124. If, for example, the electronic equipment in which the data transfer control device 120 is incorporated is a printer, the bus 90 can be used exclusively for transferring print data. As a result, the processing load on the CPU 66 can be reduced and the actual transfer speed of the entire system can be increased. In addition, an inexpensive device can be employed as the CPU 66 and it is also no longer necessary to use a high-speed bus as the CPU bus 96. This ensures that the electronic equipment can be made less expensive and more compact.

3. Configuration of SBP-2 Core (Transfer Execution Circuit)

Figure 10:
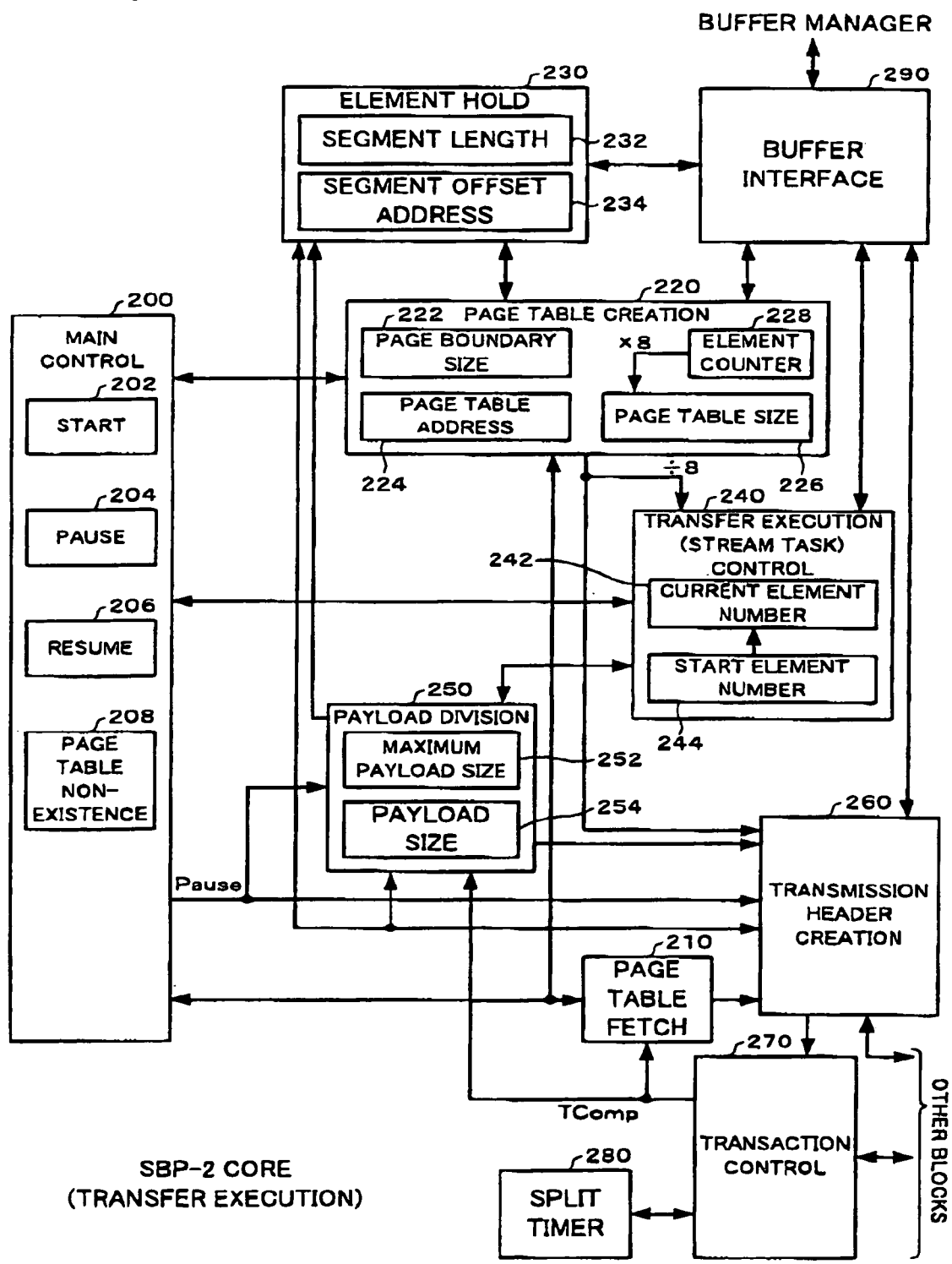
FIG. 10 shows an example of the configuration of the SBP-2 core (transfer execution circuit)

An example of the structure of the SBP-2 core 84 of FIG. 7 is shown in FIG. 10. The SBP-2 core 84 automatically divides transfer data into a series of packets then transfers the series of divided packets continuously. It mainly implements the packet transfer shown at A3 in FIG. 4 and B1 in FIG. 5 by hardware.

A main control circuit 200 is a circuit for providing control over the entire SBP-2 care 84, and it comprises registers 202, 204, 206, and 208.

In this case, the registers 202, 204, and 206 are used by the firmware (CPU) for issuing a start command, pause command, and a resume command, for data transfer (hardware SBP-2 processing). In other words, when the firmware writes 1 to the register 202, this starts processing to divide the transfer data into a series of packets and transfer them continuously. When the firmware writes 1 to the register 204 during this transfer processing, the data transfer is paused; when it writes 1 to the register 206, the paused data transfer starts again.

A register 208 is used for specifying whether or not a page table exists. That is to say, when the firmware has analyzed the ORB from the initiator and has determined that no page table exists in the data buffer of the initiator, 1 is written to the register 208. When the presence of a page table is determined, on the other hand (the case shown in FIG. 6A), 0 is written to the register 208.

When a page table exists in the data buffer (storage means) of the initiator (another node), a page table fetch circuit 210 operates to fetch that page table from the initiator. More specifically, the page table fetch circuit 210 instructs a transmission header creation circuit 260 to fetch the page table then, when the fetch is completed, instructs a page table creation circuit 220 to update the page table address and page table size.

When no page table exists in the data buffer of the initiator, the page table creation circuit 220 operates to create a virtual page table. More specifically, the page table creation circuit 220 creates the page table in accordance with an algorithm described later when the main control circuit 200 instructs the creation of the page table. It then performs processing to write the created page table to the HW page table area in RAM, through an element hold circuit 230 and a buffer interface 290.

Note that the determination of whether or not a page table exists is based on the setting in the register 208, as described above. The page table that has been fetched or created by the page table fetch circuit 210 and/or the page table creation circuit 220 is stored in the HW page table area (AR1 in FIG. 8) in RAM.

The page boundary size specified by the ORB from the initiator is set in a register 222 comprised within the page table creation circuit 220. When a page table exists, the page table address and the page table size (number of elements) specified by the ORB are set in registers 224 and 226 (see FIG. 6B). When no page table exists, on the other hand, the start address and the data length of the transfer data are set (see FIG. 6C). An element counter 228 counts the number of elements (element pointers) of the page table during the creation of the page cable.

The element hold circuit 230 holds information on the page table elements that are objects to be processed by the SBP-2 core, and comprises a register 232 for holding the segment length of the page table elements and a register 234 for holding a segment offset address.

The transfer execution control circuit 240 controls the execution of data transfer (data stream transfer) by the SBP-2 core and comprises registers 242 and 244. The register 242 displays the number of the page table element that is currently being processed. The number of the page table element at which the data transfer starts is set by the firmware in the register 244. This makes it possible for the firmware to start the data transfer from any page table element.

A payload division circuit 250 performs processing to divide the transfer data into packets of the payload size. The maximum payload size, specified by an ORB, is set in a register 252 comprised within the payload division circuit 250. Another register 254 displays the actual payload size. The payload division circuit 250 performs the payload division processing, based on the segment length of page table elements that is read out from the HW page table area (AR1 of FIG. 8) and held in the register 232 and the maximum payload size that is set in the register 252.

The transmission header creation circuit 260 creates the header of each request packet shown at A3 in FIG. 4 or B1 in FIG. 5, based on details such as a speed code and a destination ID that have been set by the firmware. The thus created header is stored in the HW transmission header area in the RAM (AR3 in FIG. 8). In this manner, this embodiment of the invention can greatly reduce the processing load on the firmware, because the automatic creation of headers of a series of request packet that is to be transferred continuously is done by the hardware.

A transaction control circuit 270 receives error information and status information from external circuit blocks such as the link core and performs processing for executing a transaction. On completion of the execution of the transaction, the transaction completion signal TComp goes active to inform the page table fetch circuit 210 and the payload division circuit 250. The SBP-2 core of this embodiment of the invention manages data transfers in transaction units, not packet units.

A split timer 280 loads a split time value when a transaction starts, then starts a count-down. When this count reaches zero, the fact that time-out has occurred is transmitted to the transaction control circuit 270.

The buffer interface 290 functions as an interface with the buffer manager 70 of FIG. 7. The configuration is such that each block of the SBP-2 core 84 requests access to the RAM 80 with respect to the buffer manager 70, through the buffer interface 290.

3.1 Main Control Circuit

The operation of the main control circuit 200 will now be described with reference to the flowchart of FIG. 1.

First of all, the main control circuit 200 determines whether or not a page table that has been previously stored in the HW page table area is to be used (step S1), then branches to step S5 when it is to be used or to step S2 when it is not going to be used. The setting that determines whether or not a page table that has been previously stored in the HW page table area is to be used is implemented by the firmware writing a given setting to a given register.

The main control circuit 200 then determines whether or not a page table exists in the data buffer of the initiator, based on the setting of the register 208 of FIG. 10 (step S2). When a page table exists, the main control circuit 200 instructs the page table fetch circuit 210 to start the fetch of the page table (step S3). When no page table exists, on the other hand, it instructs the page table creation circuit 220 to start the creation of a page table (step S4).

When the processing for fetching or creating the page table has ended, the main control circuit 200 instructs the transfer execution control circuit 240 to start the transfer execution processing (stream data task) (step S5).

Note that the page table creation circuit 220 of this embodiment of the invention creates the page table by the technique described below.

Figure 12:
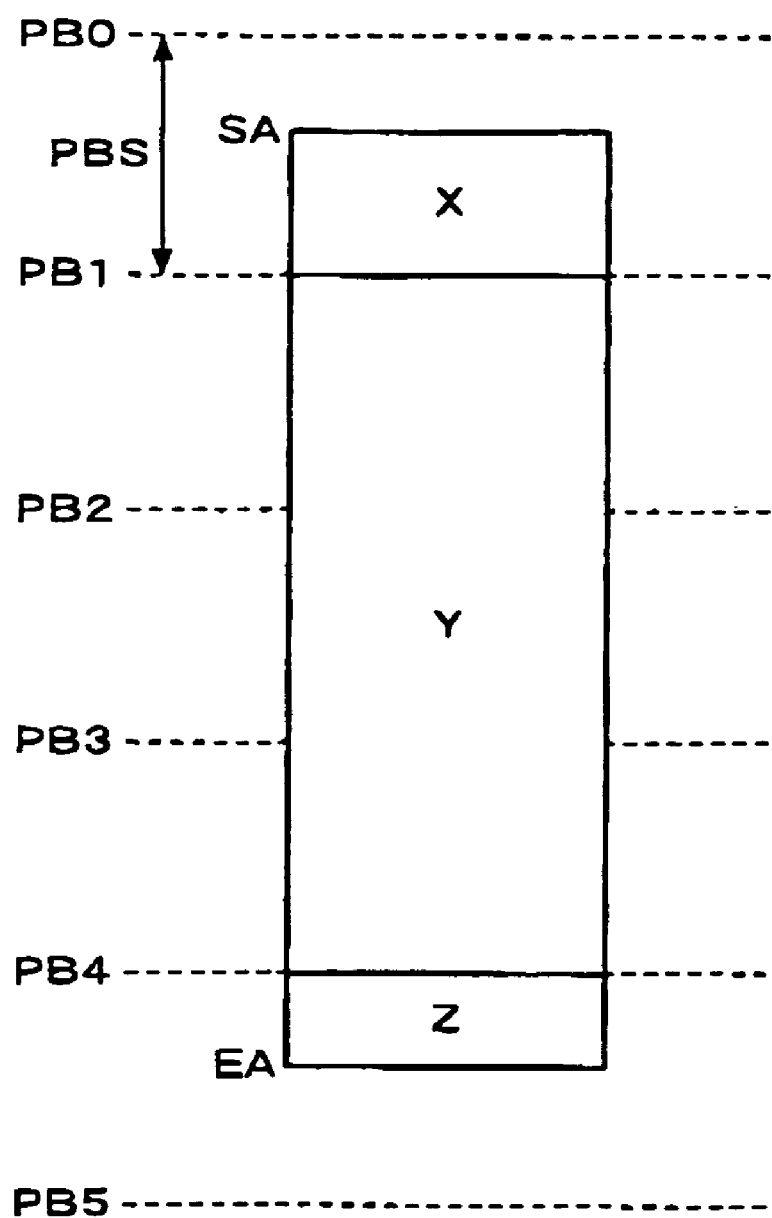
FIG. 12 illustrates the technique of creating a page table.

Assume, by way of example, that a start address SA of transfer data is between page boundaries PB0 and PB1 and an end address EA thereof is between page boundaries PB4 and PB5, as shown in FIG. 12. In this case, the page table creation circuit 220 of this embodiment of the invention creates a virtual page table in which the number of elements of the page table between the page boundary PB1 and PB4 (the Kth and Lth page boundaries) is one (broadly speaking, a predetermined number).

More specifically, it creates a three-page page table wherein a portion between the start address and the page boundary PB1 becomes an X-type page table element (a first page table element), a portion between the page boundaries PB1 and PB4 becomes a Y-type page table element (a second page table element), and a portion between the page boundary PB4 and the end address becomes a Z-type page table element (a third page table element).

It should be noted, however, that when the start address SA of the transfer data lies on the page boundary PB1 (the Kth page boundary), the X-type. page table element is not created and thus a two-page page table is formed. Similarly, when the end address of the transfer data lies on the page boundary PB4 (the Lth page boundary), the Z-type page table element is not created and thus a two-page page table is formed. Furthermore, when the start address SA of the transfer data lies between the page boundaries PB0 and PB1 and the end address EA thereof lies between the page boundaries PB0 and PB1 or on the page boundary PB1, a one-page page table is created having just the X-type page table element between SA and BA.

In this embodiment of the invention. the payload division circuit 250 of FIG. 10 divides the transfer data into packets of the payload size the maximum payload size of which is the divisor of the page boundary size. In other words, the data is divided into packets such that the maximum payload size MaxPLS is the divisor of the page boundary size PBS, as shown in FIG. 13.

Figure 13:
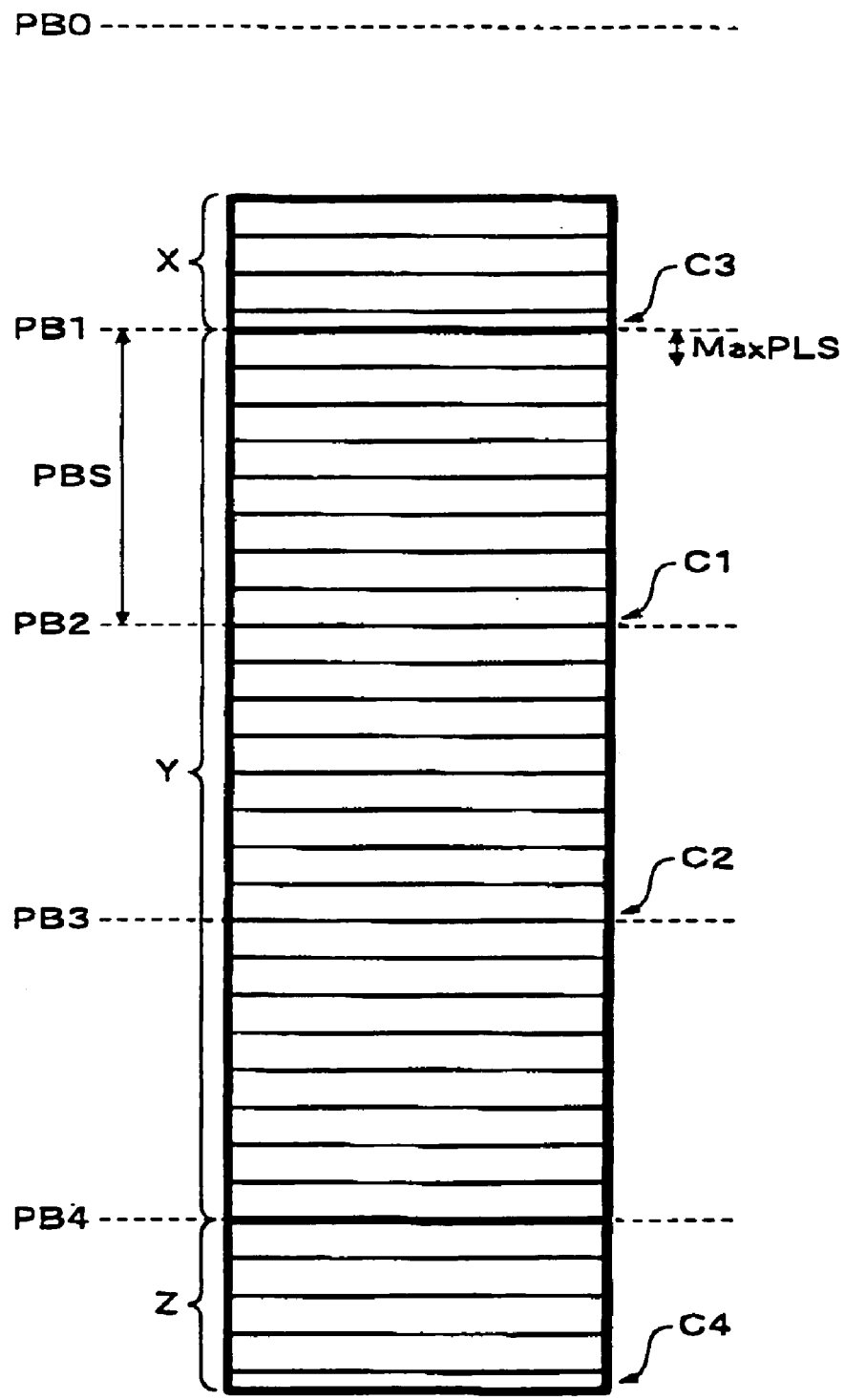
FIG. 13 illustrates the payload division technique.

When the maximum payload size MaxPLS is set to the divisor of the page boundary size PBS in this manner, this ensures that the payload of each packet does not traverse a page boundary, as shown at C1 and C2 in FIG. 13, by way of example. This ensures that data transfer can be done while observing the restrictions on traversing a page boundary, even if a page table is created such that the number of page table elements between the page boundaries PB1 and PB4 is one, as shown in this embodiment of the invention.

3.2 Transfer Execution (Stream Task) Control Circuit

Figure 14:
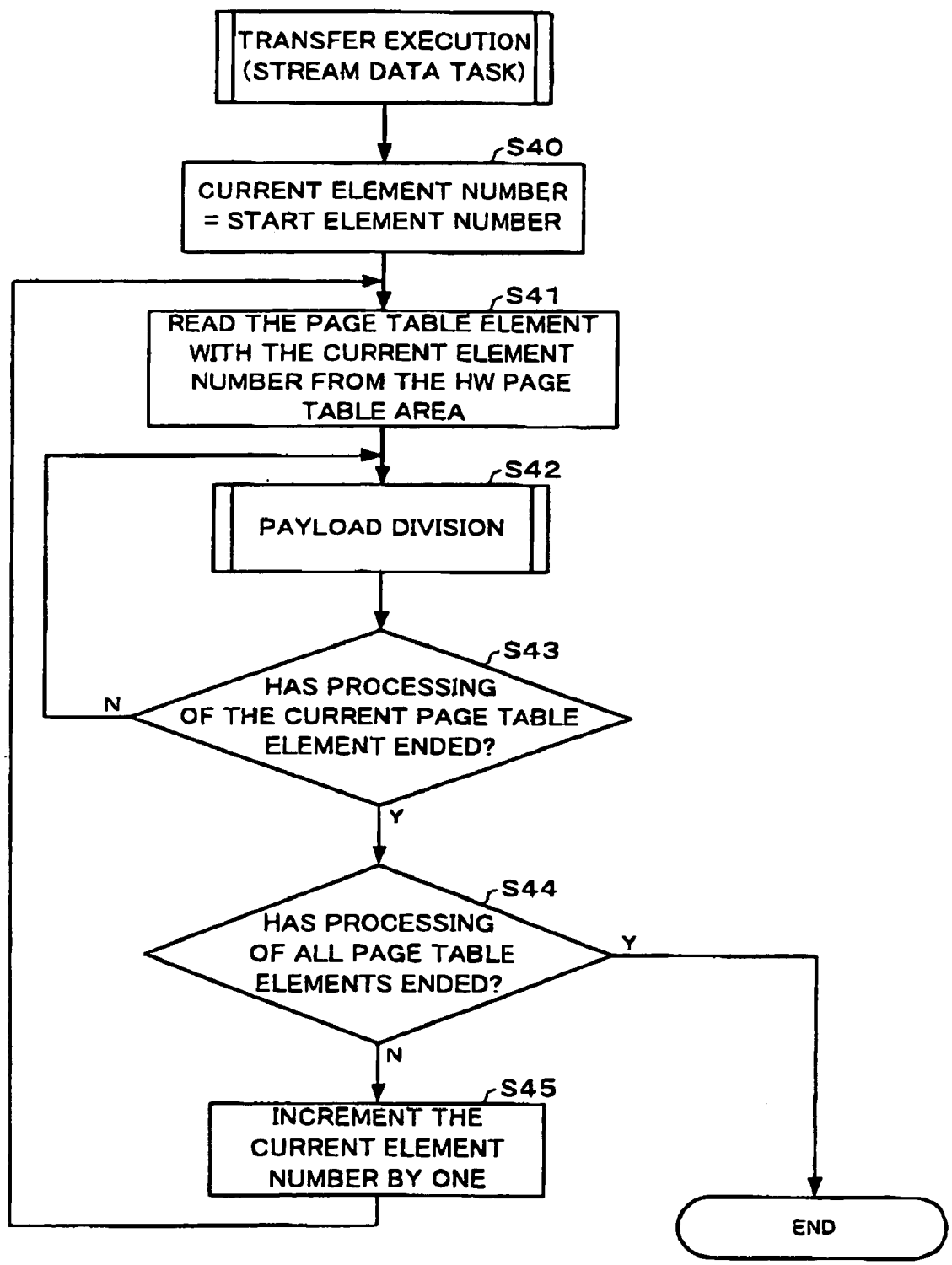
FIG. 14 is a flowchart illustrating the operation of the transfer execution control circuit.

The operation of the transfer execution control circuit 240 will now be described with reference to the flowchart of FIG. 14.

First of all, the current element number is loaded into the register 242 in FIG. 10 and the start element number is loaded into the register 244 (step S40). The page table element with the current element number is read out from the HW page table area in RAM (step S41). More specifically, the transfer execution control circuit 240 instructs the buffer interface 290 to read out the page table element that is to be processed. When this happens, the buffer interface 290 reads the page table element that is to be processed from the HW page table area in RAM, then writes the segment length of the page table element to the register 232 and the segment offset address to the register 234.

The transfer execution control circuit 240 instructs the payload division circuit 250 to start the payload division processing (step. S42).

The transfer execution control circuit 240 then determines whether the processing of the current page table element has ended (step S43) and, when it has not ended, the flow returns to step S42. When the processing has ended, on the other hand, it determines whether or not the processing of all of the page table elements has ended (step S44) and, when it has not ended, the current element number is incremented by one (step S45) then the flow returns to step S41.

Note that the determination of whether or not the processing of all of the page table elements has ended is done by comparing the number of elements obtained by dividing the page table size stored in the register 226 by 8 with the current element number.

3.3 Payload Division Circuit

Figure 15:
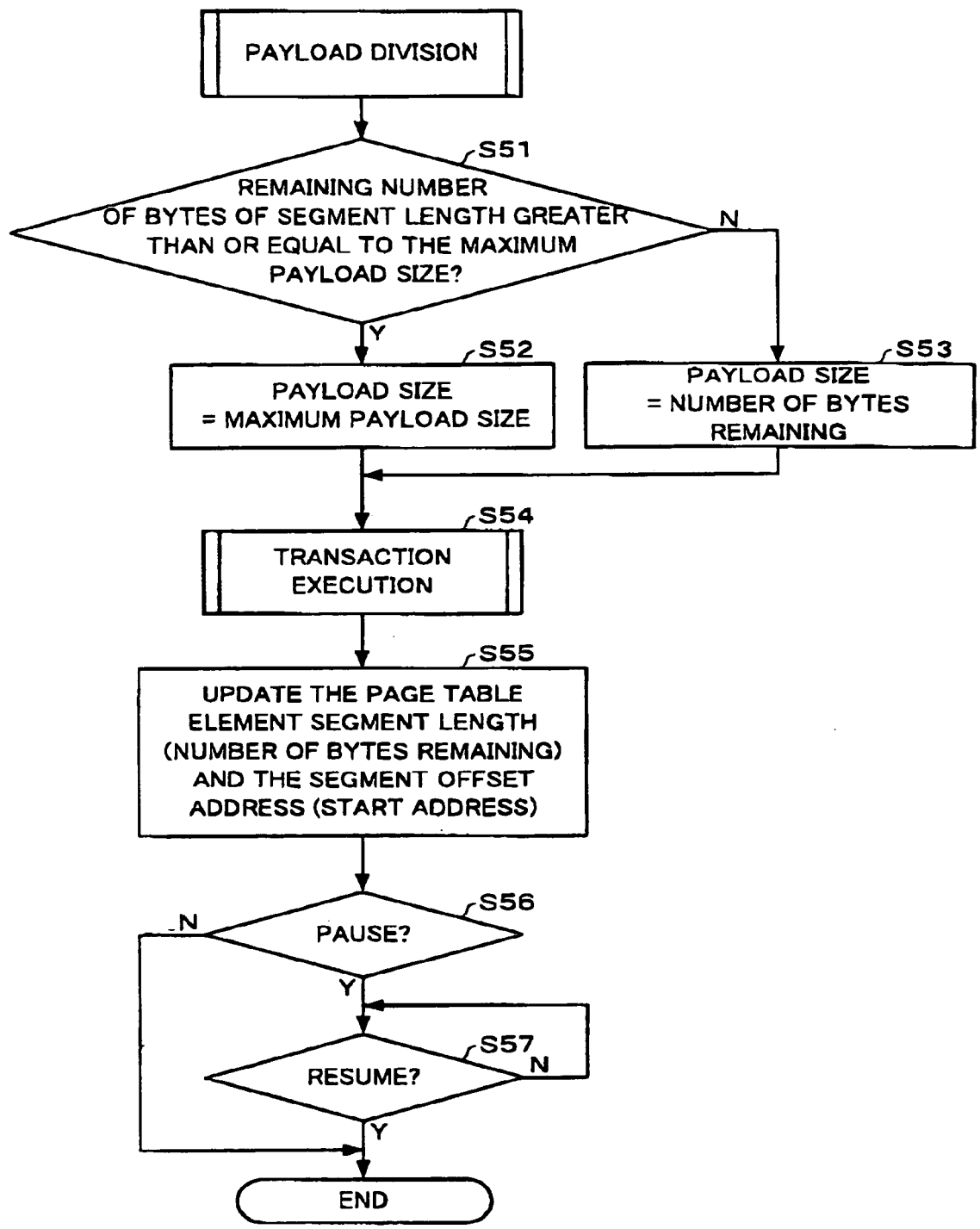
FIG. 15 is a flowchart illustrating the operation of the payload division circuit.

The description now turns to the operation of the payload division circuit 250, with reference to the flowchart of FIG. 15. The payload division circuit 250 operates to divide the transfer data into packets of the payload size, as shown in FIG. 13.

First of all, the payload division circuit 250 determines whether or not the remaining number of bytes of the segment length of the page table element that is stored in the register 232 of FIG. 10 is greater than or equal to the maximum payload size (step S51). When the remaining number of bytes is greater than or equal to the maximum payload size, the payload size of packets is set to the maximum payload size (step S52). When the remaining number of bytes is less than the maximum payload size, as shown at C3 or C4 in FIG. 13, the payload size of packets is set to the remaining number of bytes (step S53).

After the payload size has been set. the transmission header creation circuit 260 is instructed to start the transaction execution processing (create a transmission header) (step S54). When transaction completion is posted by the TComp signal from the transaction control circuit 270, the element hold circuit 230 is instructed to update the segment length (number of bytes remaining) and the segment offset address (start address) of the page table elements that are stored in the registers 232 and 234 (step S55).

The payload division circuit 250 then determines whether or not to pause the processing, based on the Pause signal from the main control circuit 200, (step S56) or, when the processing has been paused, it resumes the processing on condition that the Pause signal has gone inactive (step S57).

3.4 Transmission Header Creation Circuit and Transaction Control Circuit

The operation of the transmission header creation circuit 260 and the transaction control circuit 270 will now be described, with reference to the flowchart of FIG. 16.

The transmission header creation circuit 260 first creates a request packet header and writes it to the HW transmission header area (AR3 of FIG. 8) (step S61). More specifically, when data is to be sent to the initiator as at A3 in FIG. 4, a header for a write request (block write request) packet is written to the HW transmission header area. When data is to be received from the initiator as at B1 in FIG. 5 or when a page table is to be fetched, on the other hand, a header for a read request packet is written to the HW transmission header area.

A transfer start signal (HWStart) is then made active to instruct the start of the transfer (step S62) and the transaction control circuit 270 waits from an ACK from the initiator (step S63).

When the transmission packet was a read request packet, the transaction control circuit 270 determines whether or not the state is ACK pending (step S65) and, when the state is not ACK pending, the flow proceeds to step S72 to set an error pause state. When the state is ACK pending, on the other hand, the transaction control circuit 270 instructs the activation of the split timer (step S66) and waits for the reception of a response packet (step S67).

The transaction control circuit 270 then determines whether or not the reception of the response packet was perfect (step S68). When there is a DCE error, it waits again for the reception of a response packet; or when the reception was perfect, the flow proceeds to step S69; or in all other cases the flow proceeds to step S72 to set the error pause state. When the flow has branched to step S69, the split timer is instructed to stop, the TComp signal is made active and the transfer data pointer is updated (step S70).

When the transmission packet was a write request packet, on the other hand, the transaction control circuit 270 first determines whether or not the state is ACK pending (step 571). When the state is ACK pending, the flow proceeds to step S66; when the state is ACK complete, the flow proceeds to step S70; and in all other cases, the flow proceeds to step S72 to set the error pause state.

Note that if the flow has branched to step S72 and the error pause state has been set, the flow proceeds to step S62 on condition that processing has been resumed (step S73). In other words, the transmission header that has already been written to the HW transmission header area is re-used and the transfer restarts.

4. Cancellation of Data Transfer Start (Resume) Command

With this embodiment of the present invention as described above, the transfer processing shown at A3 in FIG. 4 or B1 in FIG. 5 is done automatically by the hardware. In other words, when the firmware instructs the start of continuous packet transfer (if it writes 1 to the register 202 of FIG. 10), the hardware of the SBP-2 core 84 automatically executes page table fetch or creation processing, payload division processing, transmission header creation processing, transfer start processing for each packet, and error processing, to transfer a series of packets automatically. This enables a huge reduction in the processing load on the firmware, enabling a large improvement in the actual transfer speed of the data transfer control device When a cable is unplugged or plugged under the IEEE 1394 configuration, however, a bus reset (broadly speaking, a reset that clears the node topology information) occurs. Since a cable could be unplugged or plugged at any time, the firmware (processing means) operating in the CPU is unable to forecast when such a bus reset will occur. It could therefore happen that the firmware issues a command to start the continuous transfer of packets during the bus reset period after a bus reset has occurred. When such a situation occurs, various problems could occur, such as the start of transmission of a large number of packets that ought to have been invalidated by the bus transfer.

A particular problem is caused by the fact that electronic equipment that incorporates such a data transfer control device tends to use an inexpensive low-speed CPU. It is therefore possible that a long delay may occur between the start of data transfer and the instruction to halt data transfer from the firmware, even if means such as an interrupt is used to inform the firmware of the occurrence of a bus reset, which makes the above described problems even more serious.

This embodiment of the invention is configured in such a manner that, when the firmware issues a data transfer start command (or resume command) during a bus reset, the execution of that command is canceled and also the firmware is informed that the execution of the command has been canceled by the bus reset. The technique used for canceling a data transfer start command or resume command is described below in more detail.

Figure 17:
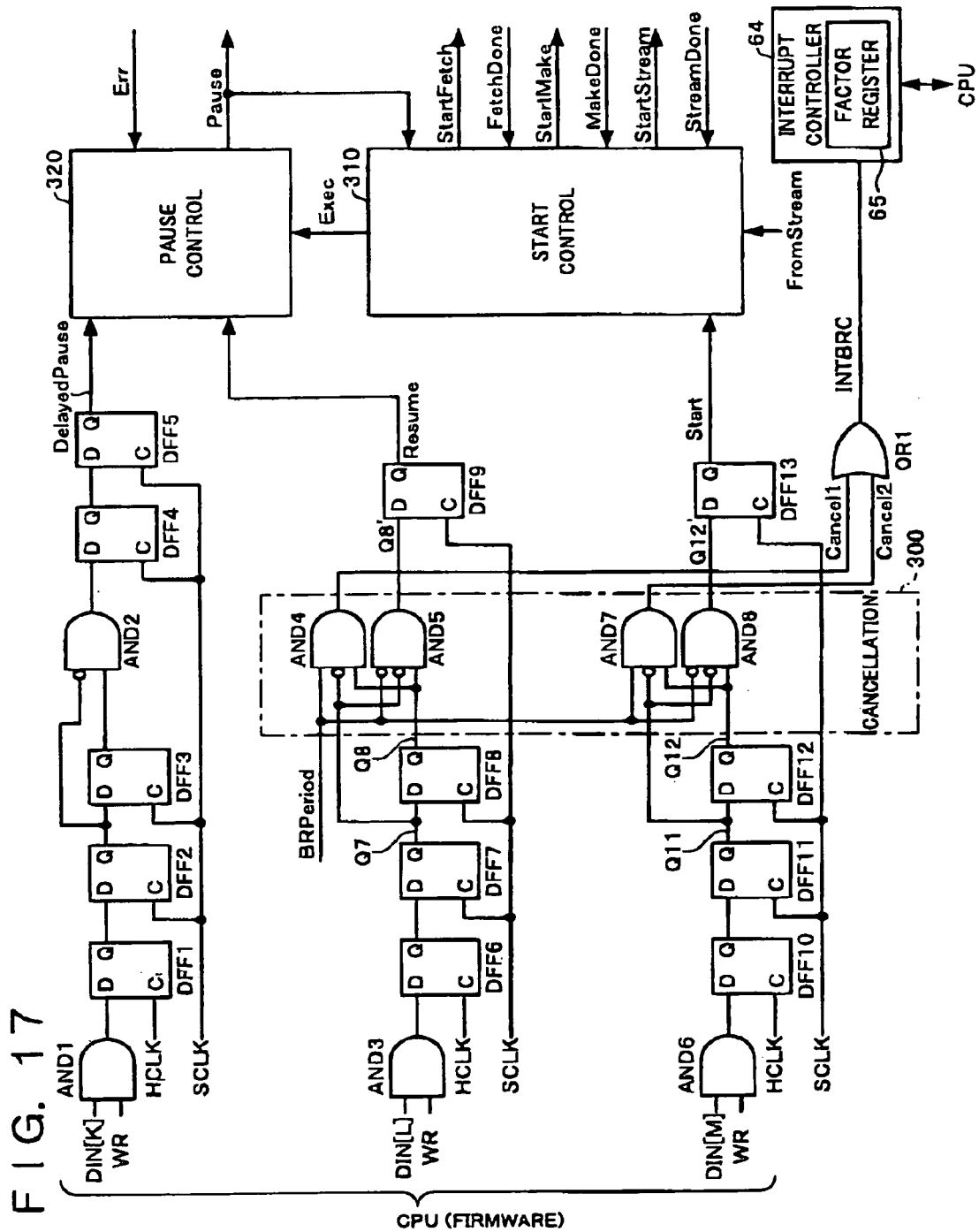
FIG. 17 shows an example of the structure of the main control circuit.

An example of the structure of the main control circuit 200 of FIG. 10 is shown in FIG. 17. Note that circuit portions that are not relevant to the present invention have been omitted from FIG. 17.

In this figure, D flip-flops DFF1, DFF6, and DFF10 are equivalent to the registers 204, 206, and 202 of FIG. 10.

When the CPU writes 1 to a bit K of a data bus signal DIN to make a write enable signal WR become 1 (active), for examples, 1 is written to DFF1 (the pause register 204) at the rise edge of HCLK which is the operating clock of the CPU. A DelayedPause signal, which is a signal of one clock (SCLK) width, is created by D flip-flops DFF2, DFF3, DFF4, and DFF5, which operate at SCLK which is the system clock of the data transfer control device, and an AND gate AND2.

When 1 is written to a bit L of the DIN signal and the WR signal goes to 1, 1 is written to the DDF6 (the resume register 206), and a Resume signal of one clock width is created by D flip-flops DFF7, DFF8, and DFF9 and an AND gate AND5.

Similarly, when 1 is written to a bit M of the DIN signal and the WR signal goes to 1, 1 is written to the DFF10 (the start register 202) and a Start signal of one clock width is created by D flip-flops DFF11, DFF12, and DFF13 and an AND gate AND8.

A cancellation circuit 300 comprises AND gates AND4, AND5, AND7, AND8.

In this case, an inverted signal of an output Q7 of the DFF7 and an output Q8 of the DFF8 are input to both the AND4 and the AND5. It should be noted, however, that a bus reset period signal BRPeriod is input unchanged to the AND4 whereas an inversion of the BRPeriod signal is input to the AND5. This input of the inverted BRPeriod signal to the AND5 ensures that, when the CPU (firmware) issues a resume command during the bus reset period, the execution of that command can be canceled.

An inverted signal of an output Q11 of the DFF11 and an output Q12 of the DFF12 are input to both the AND7 and the AND8. It should be noted, however, that the BRPeriod signal is input unchanged to the AND7 whereas an inversion of the BRPeriod signal is input to the AND8. This input of the inverted BRPeriod signal to the AND8 ensures that, when the CPU issues a start command during the bus reset period, the execution of that command can be canceled.

Cancel1 and Cancel2, which are outputs of the AND4 and the AND7, are input to an OR gate OR1. A signal INTBRC that is the output of OR1 is input to the interrupt controller 64 in the CPU interface 60 of FIG. 7.

When the CPU issues a resume command or start command during the bus reset period in which BRPeriod is 1, either Cancel1 or Cancel2 goes to 1. This sets INTBRC to 1, which issues an interrupt to the CPU through the interrupt controller 64. When that happens, the CPU reads a factor register 65 and analyzes the factor of the interrupt. This informs the CPU (firmware) that the command has been canceled by the issue of the bus reset.

A start control circuit 310 is a circuit that controls the start of data transfer. Start, FromStream, FetchDone, MakeDone, and StreamDone signals are input thereto. It outputs Start-Fetch, StartMake, and StartStream signals.

In this case, Start is a signal that goes to 1 when the CPU (firmware) issues a data transfer start command as previously described.

FromStream is a signal that goes to 1 when processing starts from stream transfer (the transfer of A3 in FIG. 4 or B1 in FIG. 5), not performing the page table fetching or creating.

StartFetch, StartMake, and StartStream are signals that go to 1 when the page table fetch circuit 210, the page table creation circuit 220, and the transfer execution control circuit 240 are instructed to fetch the page table, create the page table, or start the stream transfer, respectively.

Similarly, FetchDone, MakeDone, and StreamDone are signals that go to 1 when the corresponding page table fetch, page table creation, or stream transfer is completed.

Exec is a signal that is 1 during the execution of a data transfer.

A pause control circuit 320 is a circuit that controls any pause in the data transfer. DelayedPause, Resume, Exec, and Err signals are input thereto and it outputs the Pause signal.

In this case, DelayedPause and Resume are signals that go to 1 when the CPU issues a data transfer pause command or resume command, respectively. Note that the DelayedPause signal is delayed by one clock (SCLK) pulse after the Resume signal.

Err is a signal that goes to 1 when an error occurs during the data transfer.

The Pause signal goes to 1 when the data transfer is paused, as described with reference to step S56 of FIG. 15.

The operation of the start control circuit 310 will now be described with reference to the state transition chart shown in FIG. 18.

First of all, Comp (a completion signal) and Exec are set to zero in a state S00. When the Start signal goes to 1 and also the FromStream is 0, the state changes to a state S01 at the next clock. In this state S01, the Exec signal goes to 1. When a page table exists, the StartFetch signal goes to 1; when no page table exists, the StartMake signal goes to 1. This starts the fetch or creation of the page table. The state changes to a state S02 at the next clock, whereupon the StartFetch and the StartMake both return to 0.

Note that when both the Start and FromStream signals become 1 in state S00, the state changes to a state S04 at the next clock and the page table fetch or creation processing is omitted.

When both the FetchDone and the MakeDone signals become 1 in state S02. the state changes to a state S03 at the next clock. When the Pause signal goes to 1, the state remains at S03. when the Pause signal goes to 1 in this embodiment of the invention, the transfer processing is paused at the completion of the page table fetch or creation.

When the Pause signal goes to 0 and the state changes to S04, on the other hand, the StartStream signal goes to 1 and stream transfer starts. The StartStream signal returns to 0 at the next clock (state S05). When the stream transfer is completed and the StreamDone goes to 1, the completion signal Comp goes to 1 (state S06).

The operation of the pause control circuit 320 will now be described with reference to the state transition chart of FIG. 19.

The Pause signal goes to 0 in a state S10. When the DelayedPause and the Exec signals both become 1, the state changes to a state S11 at the next clock and the Pause signal goes to 1. This causes the transfer processing to pause. When the Resume signal goes to 1 and also the Err signal (or the Exec signal) goes to 0, the Pause signal returns to 0. This makes the paused transfer processing resume.

Figure 20:
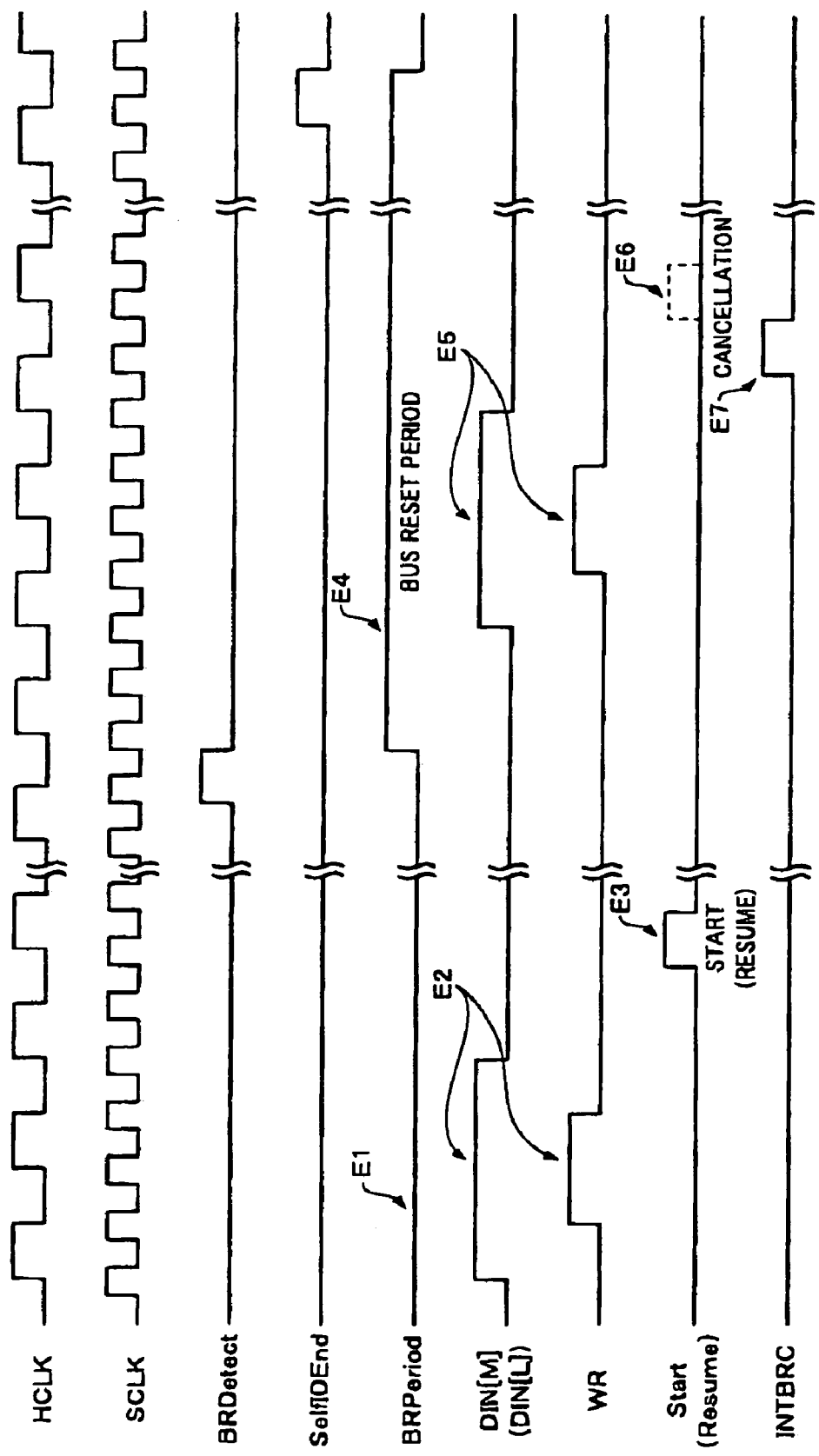
FIG. 20 is a timing waveform chart that illustrates the technique of canceling a command that was issued during the bus reset period.

A timing waveform chart used to illustrate the operation of the main control circuit of FIG. 17 is shown in FIG. 20.

In FIG. 20, BRDetect is a signal that goes to 1 when a bus reset is detected. SelfIDEnd is a signal that goes to 1 at the completion of self-identification processing performed after a bus reset. The bus reset period signal BRPeriod goes to 1 at the fall edge of the BRDetect signal and goes to 0 at the fall edge of the SelfIDEnd signal. Therefore, the period during which the BRPeriod signal is 1 is the bus reset period.

At E1 in FIG. 20, the BRPeriod signal is 0 so this is not the bus reset period. In that case, when the CPU issues a start (or resume) command and both the M (or L) bit of the DIN signal and the WR signal go to 1 at E2 and the Start (or Resume) signal goes to 1 at E3. This starts (or resume) the data transfer.

At E4 in FIG. 20, on the other hand, the BRPeriod signal is 1 so this is within the bus reset period. In that case, when the CPU issues a start (or resume) command and both the M (or L) bit of the DIN signal and the WR signal go to 1 at ES and the Start (or Resume) signal goes to 0 at E6. The start (or resume) command issued by the CPU is therefore canceled. In other words, the input of the inverted BRPeriod signal (0) to the AND5 and the AND8 of FIG. 17 ensures that the signal pulses of the Q8 and Q12 outputs are masked and Q8' Q12' outputs of the AND5 and the AND8 are fixed to 0. This also fixed the Start (Resume) signal at 0 and cancels the data transfer start (or resume).

During this time, the unchanged BRPeriod is input to the AND4 and the AND7. When a start (or resume) command is issued and thus a signal pulse is emitted from Q8 or Q12, therefore, Cancel1 or Cancel2 goes to 1 and the INTBRC goes to 1, as shown at E7 in FIG. 20. This ensures that the CPU is informed of the cancellation of the start (or resume) command by the interrupt controller 64.

With this embodiment of the invention as described above, a start (or resume) command can be canceled when it was issued during the bus reset period. No data transfer occurs, therefore, even if the CPU considers that it has issued a start command.

In other words, when transfer start is instructed for a packet after a bus reset, that packet ought to be invalidated. However, when a start command is issued in the data transfer control device of this embodiment of the invention, a series of packets will be transferred automatically in series by the hardware, as shown at A3 in FIG. 4 or B1 in FIG. 5. This packet transfer continues unless the CPU halts the transfer. This therefore makes problems such as the transmission of a large number of invalid packets, the causing of misoperation in other circuit blocks such as the link core, or disruption of the operation of the CPU. With this embodiment of the present invention, the start command issued by the CPU is canceled immediately, making it possible to avoid such problems.

Other techniques that are different from that of this embodiment of the invention could be considered, such as that described below by way of example. In other words, an interrupt alone could be issued is a start command is issued during the bus reset period, without canceling the command. The CPU, which has been informed of the bus reset by the interrupt, could write 1 to the register 204 of FIG. 10 to pause the packet transfer, by way of example.

This technique is inconvenient in that an extremely large number of packets are transmitted between the issue of the start command and the pausing of the transfer processing caused by the CPU writing 1 to the register 204. A particular problem is caused by the fact that electronic equipment that incorporates such a data transfer control device tends to use an inexpensive low-speed CPU. When such a low-speed CPU is used, a long time could elapse after the issue of a start command until the pausing of the transfer processing, which would make the above described problem even more serious.

With this embodiment of the invention, any start command that is issued during the bus reset period by the CPU is immediately canceled and data transfer is not started, thus not even one packet is transmitted. The cancellation of the command is informed to CPU in an ex-post-facto manner after the cancellation, by using the interrupt. Therefore, the above described problem can be prevented without depending on the speed of the CPU.

Note that the timing at which the bus reset occurs is arbitrary, which means that a bus reset could occur after the CPU has issued a start command. To ensure that any packet (transaction) after a bus reset is invalidated, it is necessary to temporarily halt transfer processing if a bus reset occurs after a start command is issued.

In such a case, the CPU of this embodiment of the invention has the ability to pause the transfer processing by writing 1 to the register 204 of FIG. 10 (the DFF1 of FIG. 17). After processing to distinguish invalid packets (packets from after a bus reset) and packets that are not invalid (packets from before the bus reset), transfer processing can be resumed by writing 1 to the register 206 of FIG. 10 (the DFF6 of FIG. 17).

Figure 16:
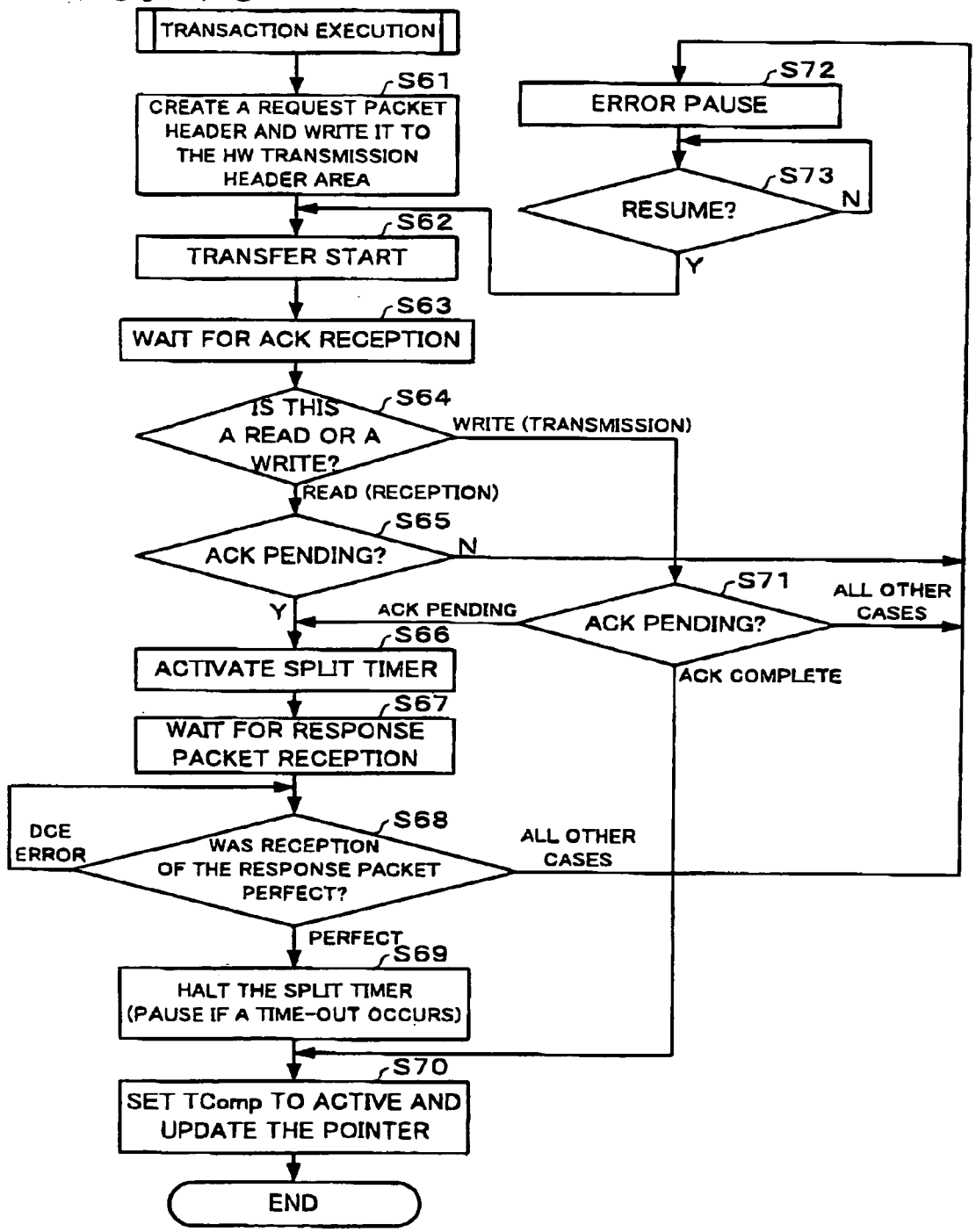
FIG. 16 is a flowchart illustrating the operation of the transmission header creation circuit and the transaction control circuit.
Figure 18:
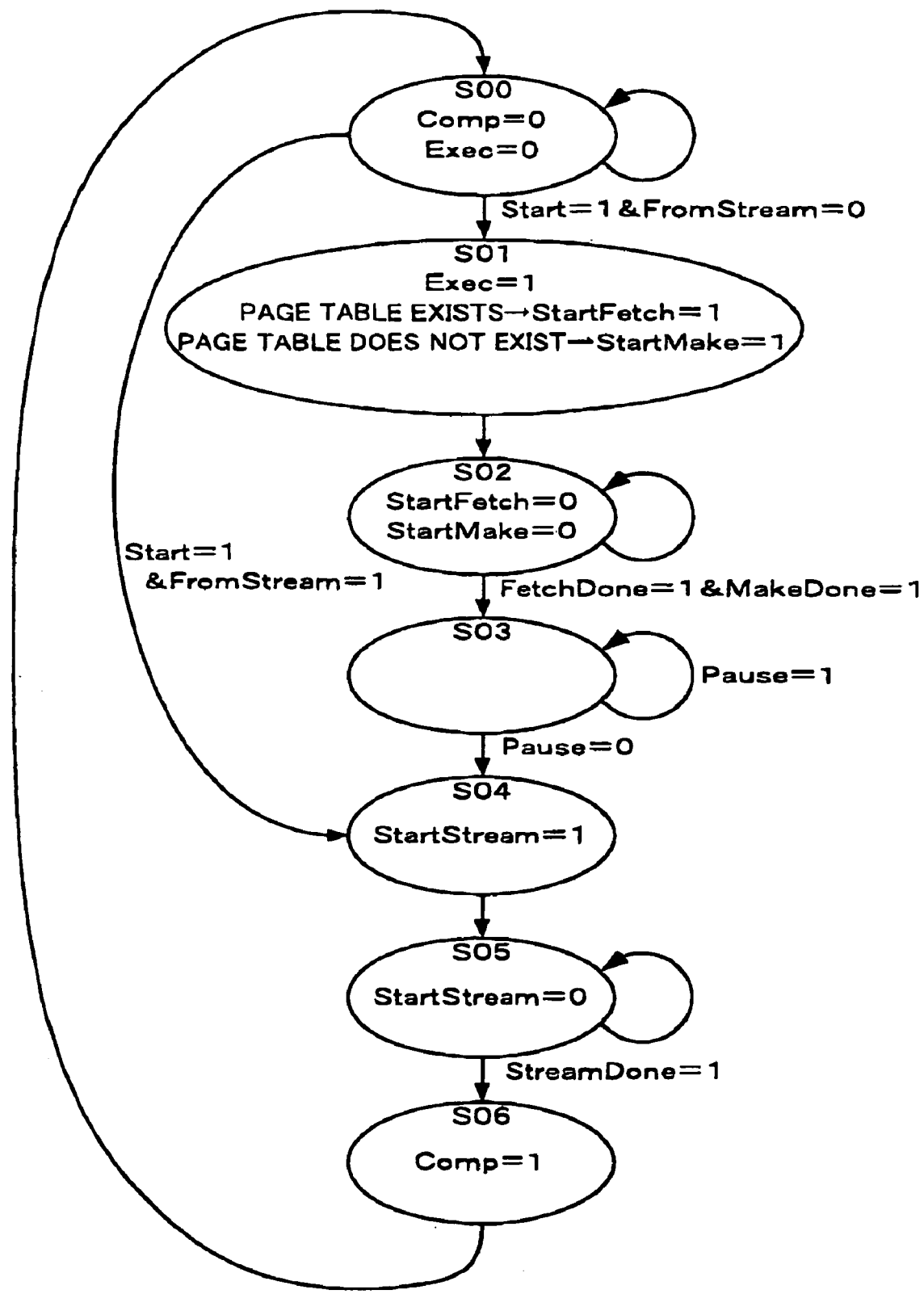
FIG. 18 is a state transition chart that illustrates the operation of the start control circuit.

Note that the location at which this embodiment of the invention pauses the transfer processing has been determined previously (at step S56 of FIG. 15, step S72 of FIG. 16, or state S03 of FIG. 18, by way of example). If it were made possible to enable pauses at any desired location, problems will occur such as an increase in the complexity of the circuit configuration, which means that determining the pause location beforehand will simplify the circuit configuration. It is possible to enable stable operation and prevent the occurrence of bugs by ensuring that transfer processing is paused at a location that provides a favorable breakpoint, such as after information has been updated (step S56 of FIG. 15), or after the start of data transfer (step S72 of FIG. 16), or after the completion of page table fetch or creation (state S03 of FIG. 18).

5. Step Execution

It is possible to implement step execution of transfer processing with the circuit of FIG. 17. In other words, when the CPU issues a resume command and a pause command together (at the same timing), transfer processing is executed in steps.

Figure 21:
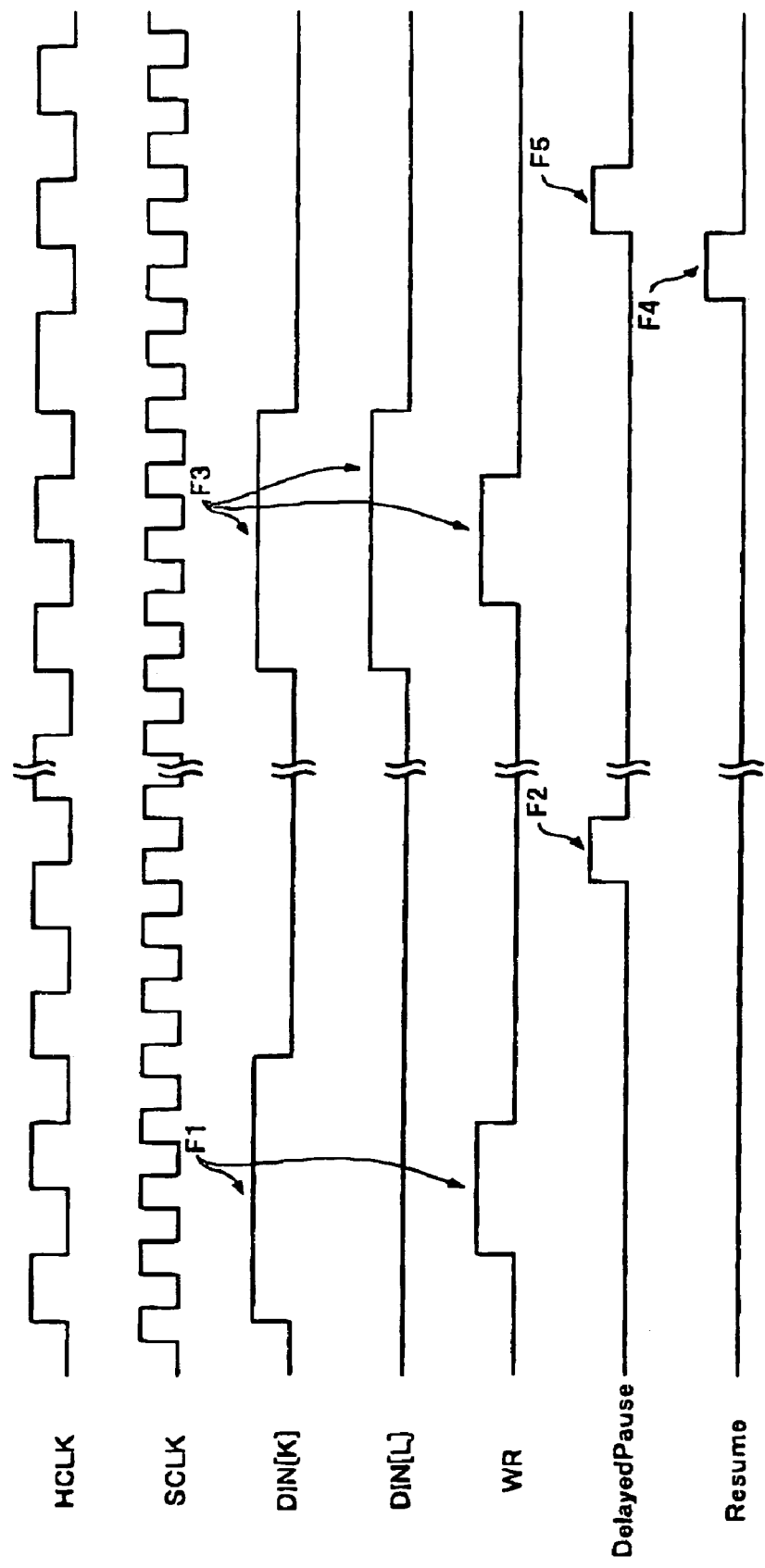
FIG. 21 is a timing waveform chart that illustrates step execution of the transfer processing.

Assume that the bit K of the data bus signal DIN and the WR signal become 1, as shown by way of example at F1 in FIG. 21. In such a case, the DelayedPause signal alone goes to 1 at F2 and the transfer processing pauses.

Assume that both the bits K and L of the DIN signal and the WR signal become 1 at F3 in FIG. 21. In such a case, the Resume signal goes to 1 at F4 and the DelayedPause signal goes to 1 after a delay of one clock period. Step execution of the transfer processing can be implemented by inputting these Resume and DelayedPause signals to the pause control circuit 320.

Figure 22:
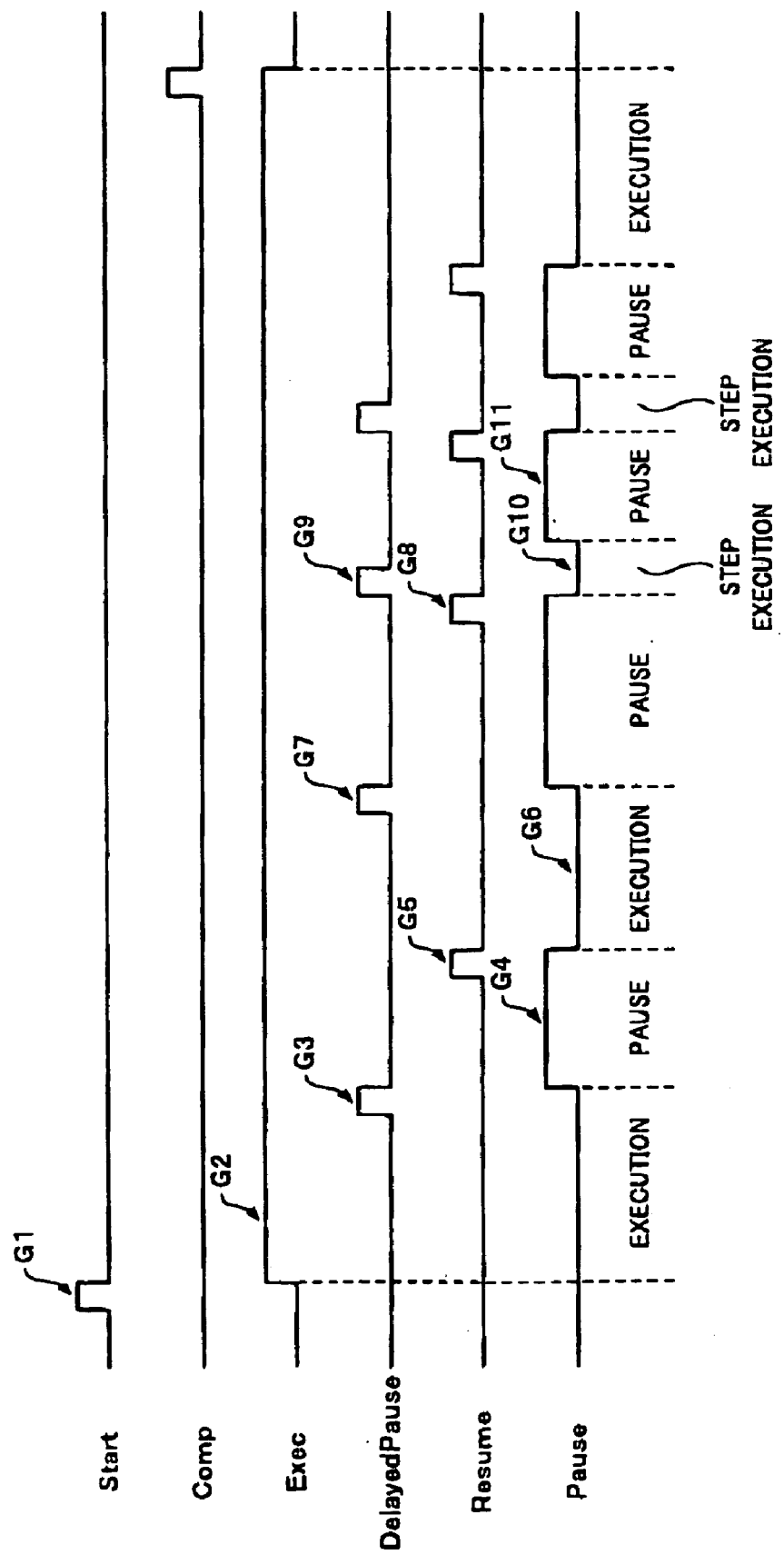
FIG. 22 is a timing waveform chart that further illustrates step execution of the transfer processing.

When the CPU issues a start command, as shown by way of example in FIG. 22, the Start signal goes to 1 at G1. This causes the Exec signal to go to 1 at G2 (state S01 of FIG. 18) and transfer processing starts.

Figure 19:
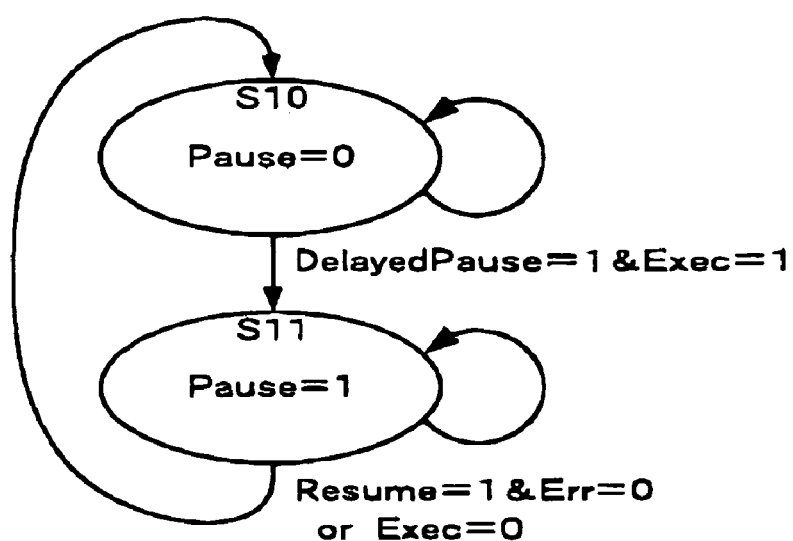
FIG. 19 is a state transition chart that illustrates the operation of the pause control circuit.

When the CPU then issues. a pause command and the DelayedPause signal goes to 1 (active) at G3, the Pause signal goes to 1 at G4 (state S11 of FIG. 19). This pauses the transfer processing at a previously determined pause location (such as at step S56 of FIG. 15 or state S03 of FIG. 18).

When the CPU subsequently issues a resume command so the Resume signal goes to 1 (active) as shown at G5, the Pause signal goes to 0 at G6 (state S10 of FIG. 19) and transfer processing resumes. When the CPU issues a pause command and the DelayedPause signal goes to 1 at G7, the transfer processing pauses again.

When the CPU subsequently issues both a pause command and a resume command together so that both the bits K and L of the DIN signal and the WR signal go to 1, as described previously with reference to F3 of FIG. 21, the Resume signal goes to 1 at G8 of FIG. 22 then the DelayedPause signal goes to 1 after a delay of one clock period. This changes the Pause signal from 1 to 0 as shown at G10, but it returns to 1 after being at 0 for one clock period, as shown at G11. This means that the transfer processing is executed for only one clock period then the transfer processing pauses at the next location at which a pause is possible. In other words, step execution of the transfer processing is implemented.

When step execution is enabled in this fashion, it become possible to transfer packets one at a time. In other words, when the CPU issues a pause command and a resume command together during the payload division of FIG. 15, the transfer processing is first resumed at step S57 by making the Pause signal go to is 0. When the Pause signal goes to 1 subsequently, the processing of step S43 of FIG. 14 and steps S51 to S55 of FIG. 15 is executed to transfer one packet of the payload size, then the transfer processing is paused (step S56). When the CPU again issues a pause command and a resume command together, the next packet is transferred then the transfer processing is paused again. By enabling step execution that transfers packets one at a time in this manner, it becomes possible to debug the firmware and the SBP-2 core.

In another technique which differs from that of this embodiment of the invention and which could also be considered, the CPU first issues a resume command and a packet is transferred, then the CPU issues a pause command in the next write cycle to pause the transfer of the packet. However, it is clear from FIG. 21 that the operating speed of the CPU is generally slow so the write cycle of the CPU is long. With the above described technique, therefore, after the CPU has issued the resume command, a plurality of packets could be transferred before the pause command is issued. In other words, it is not possible to use this technique to implement step execution for the transfer of one packet at a time.

In contrast thereto, this embodiment of the invention succeeds in implementing step execution for transferring packets one at a time, by a simple technique wherein one D flip-flop (the DFF5 of FIG. 17) is added to delay the DelayedPause signal by one clock period beyond the Resume signal.

6. Electronic Equipment

The description now turns to examples of electronic equipment comprising the data transfer control device of this embodiment.

Figure 23A:
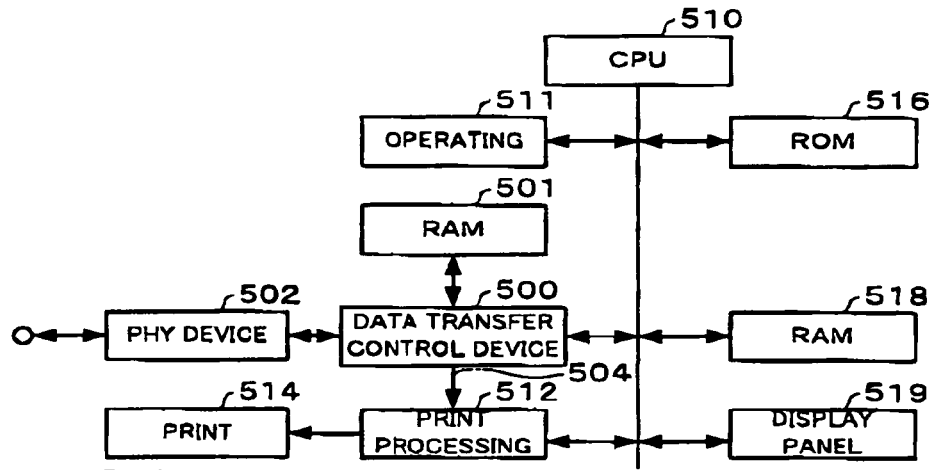
FIG. 23A, FIG. 23B, FIG. 23C show examples of the internal block diagrams of various items of electronic equipment.
Figure 24A:
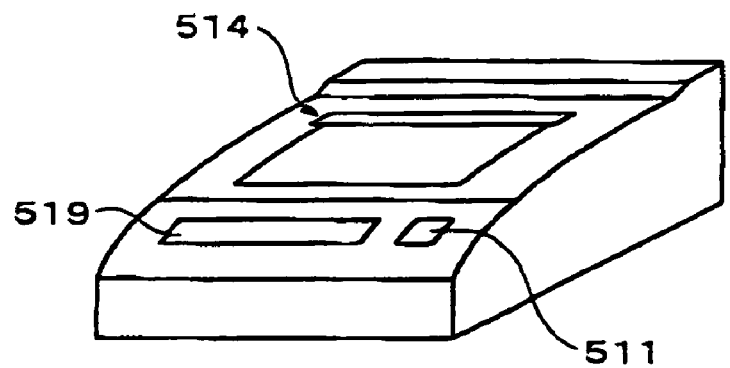
FIG. 24A, FIG. 24B, FIG. 24C show external views of various items of electronic equipment.

An internal block diagram of a printer that is one example of such electronic equipment is shown in FIG. 23A with an external view thereof being shown in FIG. 24A. A CPU (microcomputer) 510 has various functions, including that of controlling the entire system. An operating section 511 is designed to allow the user to operate the printer. Data such as a control program and fonts is stored in a ROM 516, and a RAM 518 functions as a work area for the CPU 510. A display panel 519 is designed to inform the user of the operational state of the printer.

Print data that is sent from another node, such as a personal computer, through a PHY device 502 and a data transfer control device 500 is sent directly to a print processing section 512 over a bus 504. The print data is subjected to given processing by the print processing section 512 and is output for printing to paper by a print section (a device for outputting data) 514.

Figure 23B:
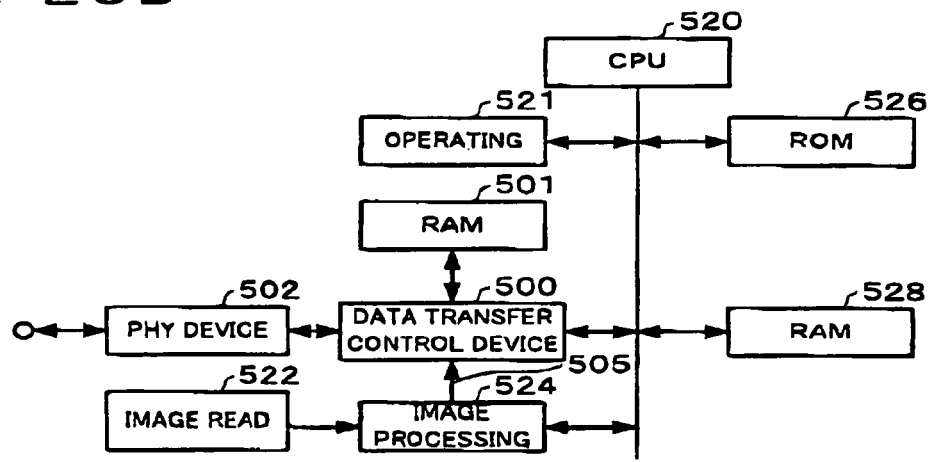
Figure 24B:
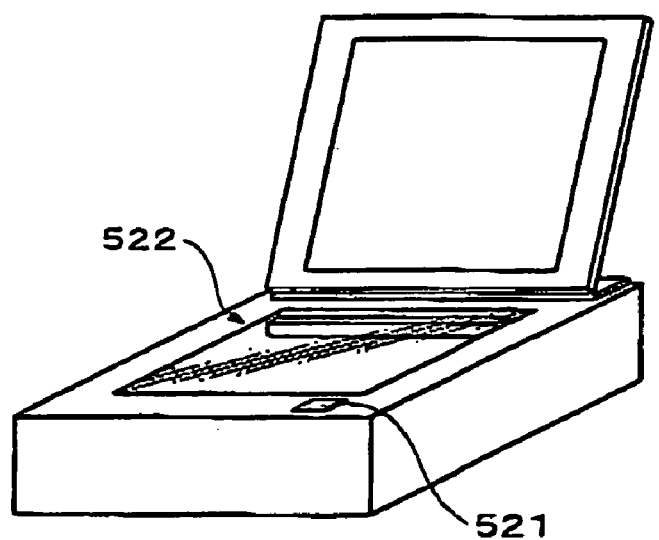

An internal block diagram of a scanner that is another example of electronic equipment is shown in FIG. 23B with an external view thereof being shown in FIG. 24B. An operating section 521 is designed to allow the user to operate the scanner. Data such as a control program is stored in a ROM 526 and a RAM 528 functions as a work area for the CPU 520.

An image of a document is read in by an image read section (a device for fetching data) 522, which comprises components such as a light source and an opto-electric converter, and data of the read-in image is processed by an image processing section 524. The processed image data is sent directly to the data transfer control device 500 over a bus 505. The data transfer control device 500 creates packets by attaching headers and the like to this image data, then sends those packets through the PHY device 502 to another node such as a personal computer.

Figure 23C:
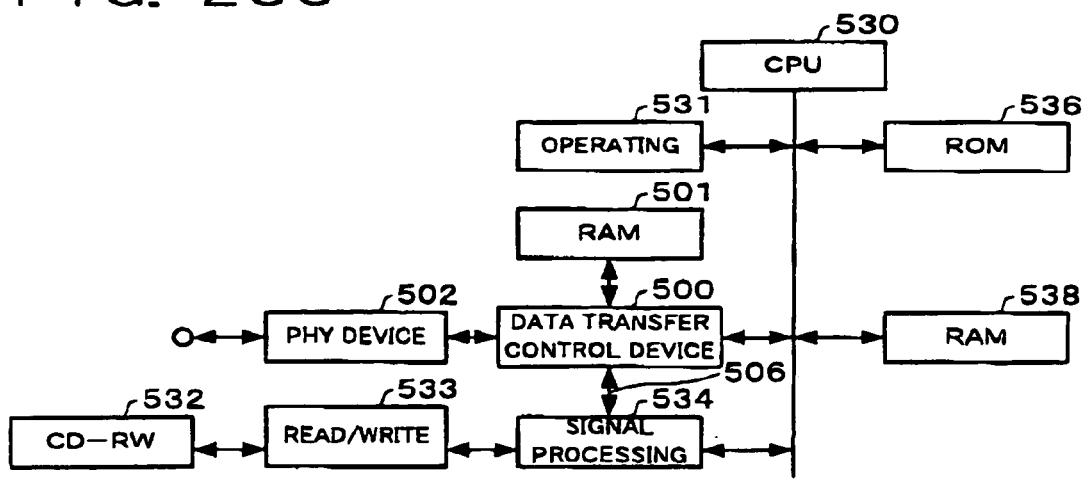
Figure 24C:
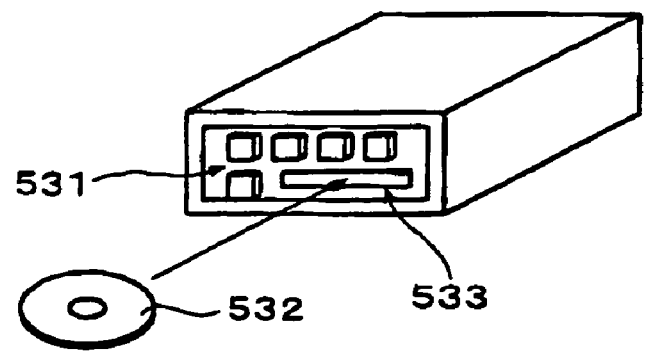

An internal block diagram of a CD-RW drive that is a further example of electronic equipment is shown in FIG. 23C with an external view thereof being shown in FIG. 24C. A CPU 530 has various functions, including that of controlling the entire system. An operating section 531 is designed to allow the user to operate the CD-RW. Data such as a control program is stored in a ROM 536 and a RAM 538 functions as a work area for the CPU 530.

Data read out from a CD-RW 532 by a read/write section (a device for fetching data or a device for storing data) 533, which comprises components such as a laser, a motor, and an optical system, is input to a signal processing section 534 where it is subjected to given signal processing such as error correction. The data transfer control device 500 creates packets by attaching headers and the like to this data, then sends those packets through the PHY device 502 to another node such as a personal computer.

Data that has been sent in from another node through the PHY device 502 and the data transfer control device 500, on the other hand, is sent directly to the signal processing section 534 over the bus 506. The data is subjected to given signal processing by the signal processing section 534 then is stored by a read/write section 533 in the CD-RW 532.

Note that another CPU could be provided to enable data transfer control by the data transfer control device 500, in addition to the CPU 510, 520, or 530 of FIG. 23A, 23B, or 23C.

In addition, a RAM 501 (equivalent to the RAM 80 of FIG. 7) is shown provided outside the data transfer control device 500 in FIGS. 28A, 28B, and 28C, but the RAM 501 could equally well be provided within the data transfer control device 500.

Use of the data transfer control device of this embodiment in electronic equipment makes it possible to perform high-speed data transfer. Therefore, if a user wishes to order a printout from a personal computer or the like, the printout can be completed with only a small time lag. Similarly, a user can see a scanned image with only a small time lag after instructing the scanner to take an image. It is also possible to read data from a CD-RW or write data to a CD-RW at high speeds. The present invention also makes it simple to use a plurality of items of electronic equipment connected to one host system or a plurality of items of electronic equipment connected to a plurality of host systems, for example.

Use of the data transfer control device of this embodiment of the invention in electronic equipment also reduces the processing load on firmware running on the CPU, making it possible to use an inexpensive CPU and low-speed buses. This enables further reductions in the cost and size of the data transfer control device, thus reducing the cost and size of the electronic equipment.

In addition, this prevents the occurrence of any problems caused by a bus reset, even when a bus reset has occurred because new electronic equipment has been connected to the bus, thus making it possible to guarantee the stable operation of the electronic equipment.

Note that the electronic equipment that can employ a data transfer control device in accordance with the present invention is not limited to the above described embodiments, and thus various other examples can be considered, such as various types of optical disk drive (CD-ROM or DVD), magneto-optic disk drives (MO), hard disk drives, TVs, VCRs, video cameras, audio equipment, telephones, projectors, personal computers, electronic note books, and dedicated wordprocessors.

Note also that the present invention is not limited to the embodiments described herein, and various modifications are possible within the scope of the invention laid out herein.

For example, the configuration of the data transfer control device in accordance with the present invention is preferably that as shown in FIG. 7, but it is not limited thereto.

Similarly, the configuration of the transfer execution circuit (SBP-2 core) is preferably that as shown in FIG. 10, but it is not limited thereto.

Furthermore, the techniques used for starting, pausing, and resuming transmission are not limited to those described with reference to these embodiments.

In addition, the configurations of the start means, pause means, resume means, and cancellation means are most preferably those as exemplified in FIG. 17, but they are not limited thereto.

The technique of posting the fact that command execution has been canceled is most preferably done by using an interrupt as described with reference to FIG. 17, but it is not limited thereto.

The present invention is particularly useful with respect to bus resets as defined by the IEEE 1394 standard, but it can also be applied to any reset that clears at least node topology information.

Similarly, the present invention is preferably applied to data transfer as defined by the IEEE 1394 standard, but it is not limited thereto. For example, the present invention can also be applied to data transfer in accordance with standards that are based on a similar concept to that of IEEE 1394 or standards that are developed from IEEE 1394.

What is claimed is:

1. A data transfer control device for transferring data among a plurality of nodes that are connected to a bus, the data transfer control device comprising:
    a control circuit which starts transfer processing when a processing unit issues a start command for data transfer, and resumes transfer processing when the processing unit issues a resume command for data transfer;
a transfer execution circuit which executes processing for dividing transfer data into a series of packets and transferring the divided series of packets continuously, when the processing unit issues the start command for data transfer;
a cancellation circuit which cancels an execution of one of the start command and the resume command, when the processing unit issues one of the start command and the resume command, respectively, during a period of a reset that clears node topology information; and
a circuit which informs the processing unit that command execution has been canceled by the reset,
wherein the cancellation circuit receives a reset period signal which becomes active during the period of the reset and makes a command signal corresponding to one of the issued start command and the issued resume command not to be transferred to the control circuit when the reset period signal becomes active, and
wherein the control circuit performs one of transfer starting and transfer resuming when the processing unit issues one of the start command and the resume command during a period other than the period of the reset.

2. The data transfer control device as defined in claim 1, further comprising:
an interrupt controller which issues an interrupt with respect to the processing unit when an execution of the start command or the resume command for data transfer is cancelled by the occurrence of the reset; and
factor storage register which informs the processing unit of a factor of the interrupt.

3. The data transfer control device as defined in claim 1, wherein the cancellation circuit cancels the start command or the resume command by using a signal that goes active during the reset period to mask a signal that goes active when the processing unit issues the start command or the resume command.

4. The data transfer control device as defined in claim 1, further comprising:
a pause control circuit which pauses transfer processing at a previously determined location when the processing unit issues a data transfer pause command or when a transfer error occurs.

5. The data transfer control device as defined in claim 1, wherein the reset is a bus reset as defined by the IEEE 1394 standard.

6. Electronic equipment comprising:
the data transfer control device as defined in claim 5;
a device for performing given processing on data that has been received from another node via the data transfer control device and the bus; and
a device for outputting or storing data that has been subjected to the processing.

7. Electronic equipment comprising:
the data transfer control device as defined in claim 5;
a device for performing given processing on data that is to be transferred to another node via the data transfer control device and the bus; and
a device for fetching data to be subjected to the processing.

8. Electronic equipment comprising:
the data transfer control device as defined in claim 1;
a device for performing given processing on data that has been received from another node via the data transfer control device and the bus; and
a device for outputting or storing data that has been subjected to the processing.

9. Electronic equipment comprising:
the data transfer control device as defined in claim 1;
a device for performing given processing on data that is to be transferred to another node via the data transfer control device and the bus; and
a device for fetching data to be subjected to the processing.

10. A data transfer control device for transferring data among a plurality of nodes that are connected to a bus, the data transfer control device comprising:
a transfer execution circuit which executes processing for dividing transfer data into a series of packets and transferring the divided series of packets continuously, when processing unit issues a start command for data transfer; and
a pause control circuit which pauses a transfer processing after a step execution of the transfer processing, when the processing unit issues a resume command and a pause command for data transfer together,
wherein the pause control circuit pauses the transfer processing after the completion of the transfer processing of the step execution.

11. The data transfer control device as defined in claim 10, wherein the pause control circuit executes the step execution and the pause of the transfer processing, based on a resume signal that goes active when the resume command is issued, and a delay pause signal that goes active after a delay of a given period after the resume signal goes active when the resume command and the pause command are issued together.

12. The data transfer control device as defined in claim 1, wherein data transfer is performed in accordance with the IEEE 1394 standard.

13. Electronic equipment comprising:
the data transfer control device as defined in claim 12;
a device for performing given processing on data that has been received from another node via the data transfer control device and the bus; and
a device for outputting or storing data that has been subjected to the processing.

14. Electronic equipment comprising:
the data transfer control device as defined in claim 12;
a device for performing given processing on data that is to be transferred to another node via the data transfer control device and the bus; and
a device for fetching data to be subjected to the processing.

15. The data transfer control device as defined in claim 10, wherein data transfer is performed in accordance with the IEEE 1394 standard.

16. Electronic equipment comprising:
the data transfer control device as defined in claim 15;
a device for performing given processing on data that has been received from another node via the data transfer control device and the bus; and
a device for outputting or storing data that has been subjected to the processing.

17. Electronic equipment comprising:
the data transfer control device as defined in claim 15;
a device for performing given processing on data that is to be transferred to another node via the data transfer control device and the bus; and a device for fetching data to be subjected to the processing.

18. Electronic equipment comprising:

the data transfer control device as defined in claim 10;

a device for performing given processing on data that has been received from another node via the data transfer control device and the bus; and a device for outputting or storing data that has been subjected to the processing.

19. Electronic equipment comprising:

the data transfer control device as defined in claim 10;

a device for performing given processing on data that is to be transferred to another node via the data transfer control device and the bus; and a device for fetching data to be subjected to the processing.

* * * * *